United States Patent [19]

Blanchard, Jr. et al.

[11] 4,430,644

[45] Feb. 7, 1984

[54] ENCODING APPARATUS HAVING AN ACOUSTIC MEMBER WITH MIRROR-IMAGE TABS

[75] Inventors: Raymond A. Blanchard, Jr., Freeville, N.Y.; Kenneth E. Garey, San Jose, Calif.

[73] Assignee: SCM Corporation, New York, N.Y.

[21] Appl. No.: 317,038

[22] Filed: Nov. 2, 1981

[51] Int. Cl.$^3$ .......................... G06F 3/02; H04L 15/03

[52] U.S. Cl. .............................. 340/365 R; 178/17 C; 340/365 S

[58] Field of Search ........... 340/365 R, 365 A, 365 S; 178/17 C, 18, 19; 400/479; 310/323, 328, 329, 334, 332; 181/142

[56] References Cited

U.S. PATENT DOCUMENTS

| | | | |
|---|---|---|---|
| 4,378,552 | 3/1983 | Jalbert | 340/365 R |
| 4,381,501 | 4/1983 | Pajer et al. | 340/365 R |

*Primary Examiner*—James J. Groody

*Attorney, Agent, or Firm*—Armand G. Guibert; Ernest F. Weinberger

[57] ABSTRACT

A simplified, symmetrical encoding apparatus of the acoustic rod type with polarized output signals, e.g., where key-actuated strikers impact an acoustic bar having a number of differently-shaped tabs on the bar, the impact giving rise to divergent acoustic waves sensed by a transducer at each end of the bar. Providing paired sets of a non-polarizing tab and oppositely-oriented raked (polarizing) tabs in mirror image form at desired locations on right and left halves of the bar, preferably with a first tab located at the bar's midpoint, facilitates distinguishing between impacts on the different tabs.

19 Claims, 14 Drawing Figures

SHIFT
406
408
642
642g
642d
643
644
+v
25-7
25-1
158
656
654g
654
185
185a
658

468
451
649
649g
652
652g
650
627A
626C
I
II
629
640g
640
638g
638
636g
636
641g
641
432C
432B
432A
639g
639
637g
637

633
631
628R
628L
466a
466b
466h
466k
626A
626B
660
627B
627C
608
+Vdd

ENCODING APPARATUS HAVING AN ACOUSTIC MEMBER WITH MIRROR-IMAGE TABS

CROSS-REFERENCE TO RELATED APPLICATIONS

The present application is an improvement on the acoustic methods and apparatus disclosed generally in copending applications Ser. No. 853,778 filed Nov. 21, 1977 now abandoned; Ser. No. 892,814 filed Apr. 3, 1978, both invented by Vincent P. Jalbert, the former having issued Mar. 29, 1983, as U.S. Pat. No. 4,378,552 and the latter having issued Mar. 28, 1981, as U.S. Pat. No. 4,258,356; and—more specifically—Ser. No. 246,820 filed Mar. 21, 1981, now U.S. Pat. No. 4,381,501, in the name of Raymond T. Pajer, et al, now U.S. Pat. No. 4,381,501 issued Apr. 26, 1983; all three specifications having the same assignee. To the extent appropriate to the present invention, the disclosures of the above-identified copending applications are incorporated herein by reference.

BACKGROUND OF THE INVENTION

1. Field of the Invention

This invention relates to encoding apparatus and to methods associated with such. More particularly, the invention relates to application of acoustic methods to encoding keyboards.

2. Description of the Prior Art

Encoding apparatus for use with many and varied types of equipment have long been known. Yet, there is a continued search for low cost, simple encoders having high reliability. Apparatus of that type based on detection of acoustic wave fronts and specifically applied to keyboards have been briefly disclosed in IBM Technical Disclosure Bulletins—e.g., Arosenius, Vol. 14, No. 10, March 1972, and Lisk Vol. 29, No. 1 June 1977—and specific approaches using long rods of "bars" are more fully disclosed in the above-mentioned copending applications and in British Pat. No. 1,386,070. The third of the copending applications (Ser. No. 246,820, referred to hereinafter as "prior application III", for brevity) discloses an improved technique which relies on the polarity of the wave fronts to discriminate between different key inputs when accumulations of tolerances cause overlap in the elapsed times obtained upon depression of the different keys.

While such acoustic keyboards are a considerable improvement over known art, problems have been encountered when considerations of mass production have been introduced—particularly in connection with transfer of the encoding/decoding logic to single chips of the solid state variety applicable, say, to electronically controlled typewriters. The amount of logic required by the prior art (even including the abovementioned copending application III) is such as to approach or exceed the upper limits on the size of such chips. Accordingly, there is need for an encoding apparatus of the acoustic wave type using structure and a logic approach which is less demanding in terms of chip surface area.

SUMMARY OF INVENTION

It is, therefore, an object of the invention to achieve an improved encoding apparatus using an acoustic technique.

Still another object is to provide a highly reliable though simple and inexpensive, mass-producible acoustic keyboard with solid state encoding in a single chip.

Finally, it is an object of the invention to provide an encoding keyboard of the acoustic type which has a single bar providing polarized outputs from mirror-image impact points which may include a central impact point, and preferably uses mass-produced, integrated circuitry of the solid state variety.

The basic invention relates to an encoding apparatus of the acoustic type which comprises an acoustic member of the kind having diverging wave fronts traveling within the member upon selective activation of any one of a plurality of tabs on the member, the wave fronts being of the same or different polarity; transducers operatively connected to the member for sensing the diverging wave fronts and producing signals with an elapsed time therebetween, and specifically the improvement in such apparatus wherein the plurality of tabs are arranged in sets comprising a non-polarizing tab producing wave fronts of the same polarity and at least one polarizing tab of the set producing wave fronts of different polarity, the sets of tabs being disposed along the member in mirror-image pairs with respect to the midpoint thereof; time-responsive units connected to the transducers for generating from the elapsed time a discrete output signal from each mirror-image pair of tab sets; together with first means connected to the transducers and responsive to the polarity of each wave front for providing a first signal on sensing wave fronts indicative of an impact against the non-polarizing tab of a set and a second signal on sensing wave fronts indicative of an impact against a polarizing tab of the set, means connected to the transducers and responsive to the relative sequence of the sensed wave fronts for producing a third signal indicating the side of the member on which a wave front is first sensed, and code-generating means producing a unique code identifying the particular tab inducing the acoustic energy, the code-generating means being responsive to the discrete output signal and the provided one of the first and second signals in conjunction with the third signal.

Other objects and inventive features as well as advantages of same will be found in the following detailed description of preferred embodiments as shown in the accompanying drawing.

DESCRIPTION OF THE DRAWING

FIGS. 5*a* to 5*d* show an alternate embodiment using N-MOS technology applicable to a single integrated circuit chip for the electronic portion of the modified apparatus.

Figure 1:
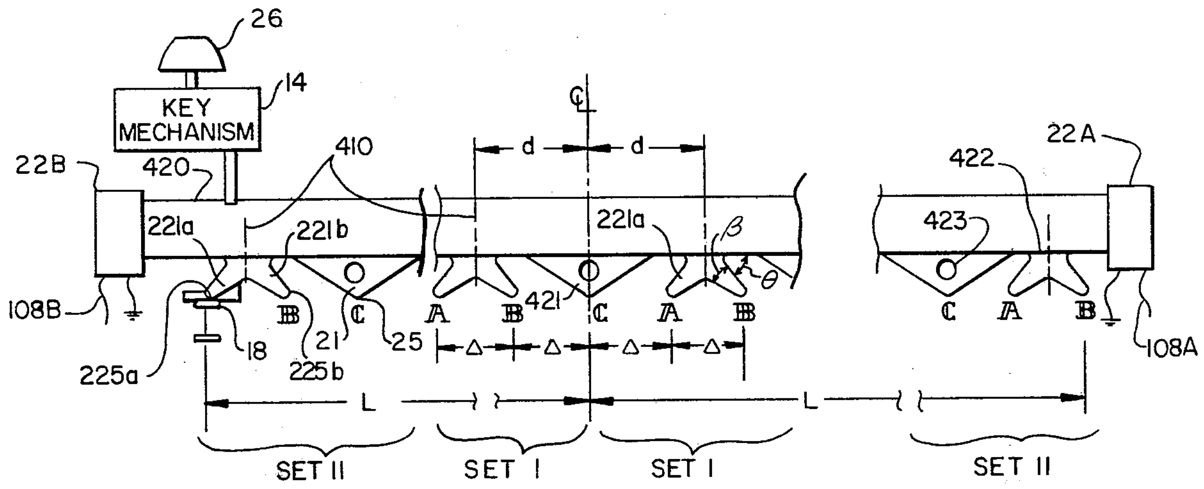
FIG. 1 shows an elevation view of a keyboard element utilizing an acoustic bar according to a preferred embodiment of the invention, the bar being essentially rectangular and having a tab in the form of an isosceles triangle at the centerline, flanked by tab pairs preferably formed as obtuse triangles tilted clockwise and counterclockwise, the pattern being repeated along each side of the bar in mirror-image fashion, respectively, as viewed in the figure. A keybutton and its mechanism for flicking an acoustic wave generating striker are shown at one point only, being omitted everywhere else for clarity.

Because these figures depend in part upon the disclosure of the above-mentioned copending applications, the previous reference numerals have been retained wherever parts are substantially identical while actually new items have been numbered beginning with 400.

DESCRIPTION OF THE PREFERRED EMBODIMENTS

As can be seen in FIG. 1, the basic operating elements for code generation are those disclosed in the above-mentioned prior applications I, II and/or III—namely, the keybutton 26 of the mechanism 14 for flicking a striker 18, causing it to impact an acoustic bar 420 and preferably at the tip 225*a* (or 225*b*, 25), of any one of three types of projections 221*a* or 221*b* or 21 on bar 420 (these projections will be termed "tabs" hereinafter for convenience and consistency, being respectively designated as type A, B, or C).

As detailed in copending application III, impact of striker 18 on a tab of any type (A, B, or C) gives rise to diverging acoustic waves sensed by transducers 22A and 22B located at respective ends of bar 420. Upon sensing of the waves by these transducers 22A and 22B, the transducer output lines 108A and 108B produce characteristically different sets of electrical signals (see copending application III) for respective ones of the three types of tabs, e.g., the signal sets for the type C tabs (symmetrically triangular in shape) both having a positive-going initial half-cycle as obtained with the original rod of prior application I, while the type A and type B tabs (identical, but oppositely oriented or "raked" obtuse triangles) are "polarized", each having one wave front with a negative initial half-cycle, but traveling in an opposite direction for one type of raked tab (221*a*, say) as compared to the other (221*b*, say). Thus, for impact on a type A tab, the right transducer 22A (as viewed in FIG. 1) senses a wave front with an initial positive signal rise and the left transducer a wave front with initial negative signal change. Conversely, impact on a type B tab is sensed on the left as an initially positive-going signal and on the right as an initially negative-going signal. Upon passage through the signal conditioning circuitry 216A, 216B the waves propagating in each direction give rise to a series of positive pulses, the first half-cycle of the earlier-sensed wave of the two causing a counter to operate—as before—but the first half-cycle of the later-sensed wave of the two now causing Counter 447 to stop its counting. The counter output being encoded while counting progresses (as discussed subsequently), the encoded value of the last count is thereafter made available for control purposes in a fashion similar to that disclosed in the copending applications, but differing in a couple of important aspects.

According to copending application III, generation of a negative half-cycle is preferably achieved by choosing tabs formed with obtuse triangles—i.e., those where the external angle $\theta$ (see FIG. 1) of the obtuse triangle is less than 90°, preferable 60° to 75°. The shape of the tabs of type A and B used in Bar 420 of the present invention is slightly different, the preferred value for angle $\theta$ being about 45°. Also, while copending application III disclosed that the size of the internal angle $\beta$ at the tip 225*a*, 225*b* was not significant in terms of wave front polarization, it should be noted that the preferred value herein is about 15°, a value at one extreme of the range given in that application. The changed shape of the polarizing tabs 221*a*, 221*b* resulted in production of transducer signals with greater amplitude (a minimum of 2 volts) and more uniformity with respect to impacts at different points along Bar 420, allowing a higher threshold value to be used and thus reduce sensitivity to noise.

In this respect, it should also be mentioned at this point that the material for Bar 420 is preferably a stainless steel (e.g., AISI No. 410—low chrome) for reasons of maintaining signal strength. Apparently, relatively small amounts of corrosion at the impact point impair signal amplitude and uniformity from one tab to the next.

Each tab, no matter what the type, is thinner in section than the remainder of Bar 420, and further a hole 423 is provided in the upper part of each triangular tab 21 of type C. The reasons for incorporating these structural features are detailed in two other copending applications: Ser. No. 246,818 now U.S. Pat. No. 4,376,469 filed Mar. 23, 1981, by Scott Longrod, which issued Mar. 15, 1983, as U.S. Pat. No. 4,376,469; and Ser. No. 246,819 filed Mar. 23, 1981, by Sigurd Hoyer-Ellefsen, which issued May 24, 1983, as U.S. Pat. No. 4,384,633; both of these inventions being assigned to the assignee of the present application. Mechanical aspects will not be described further, sufficient having been stated with respect to FIG. 1 and reference being made to copending applications I and II, insofar as the key mechanisms and their interaction are concerned.

Having described the basic elements according to the invention, a first embodiment of the invention is next described in which tabs 221*a*, 221*b* and 21—i.e., types "A", "B", and "C", respectively—are used on a Bar 420 in the particular arrangement of FIG. 1, an arrangement permitting the desired significant simplification of the encoding logic with resultant reduction in number of elements, these last being implemented with commercially available components.

Figure 2:
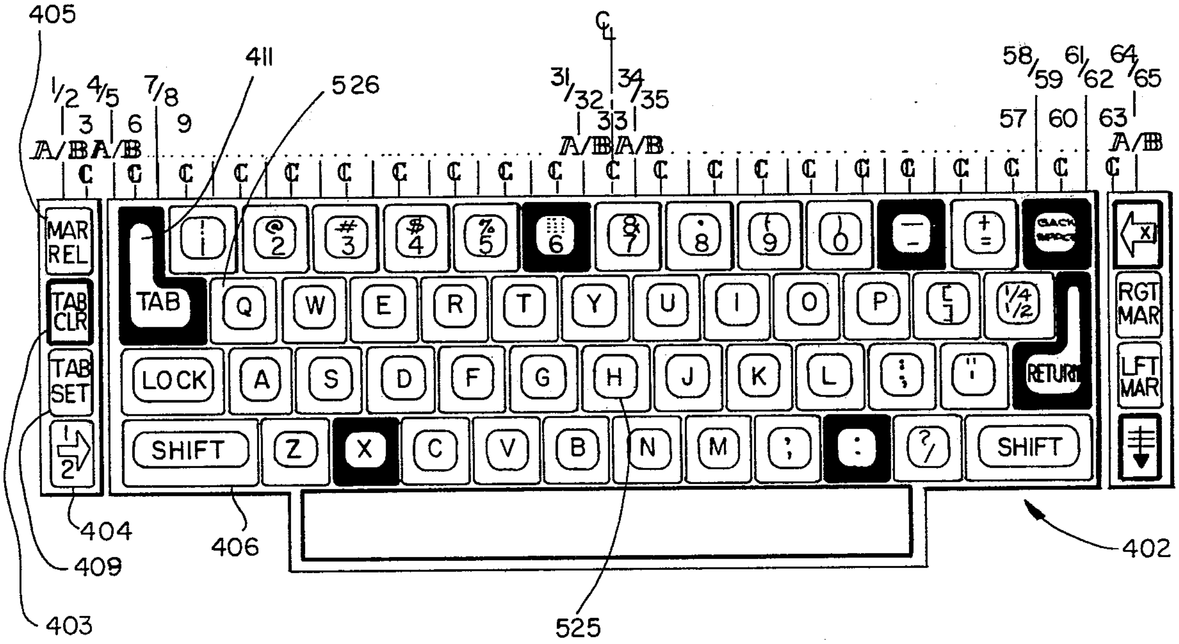
FIG. 2 shows a keyboard to which the invention is applicable using a bar of the modified type shown in FIG. 1, the bar having 65 tab elements which are substantially those for the acoustic bar of copending application III, the modified bar simplifying the logic to either require fewer commercially available LSI components or to permit adaptation to single chip integration.
Figure 3:
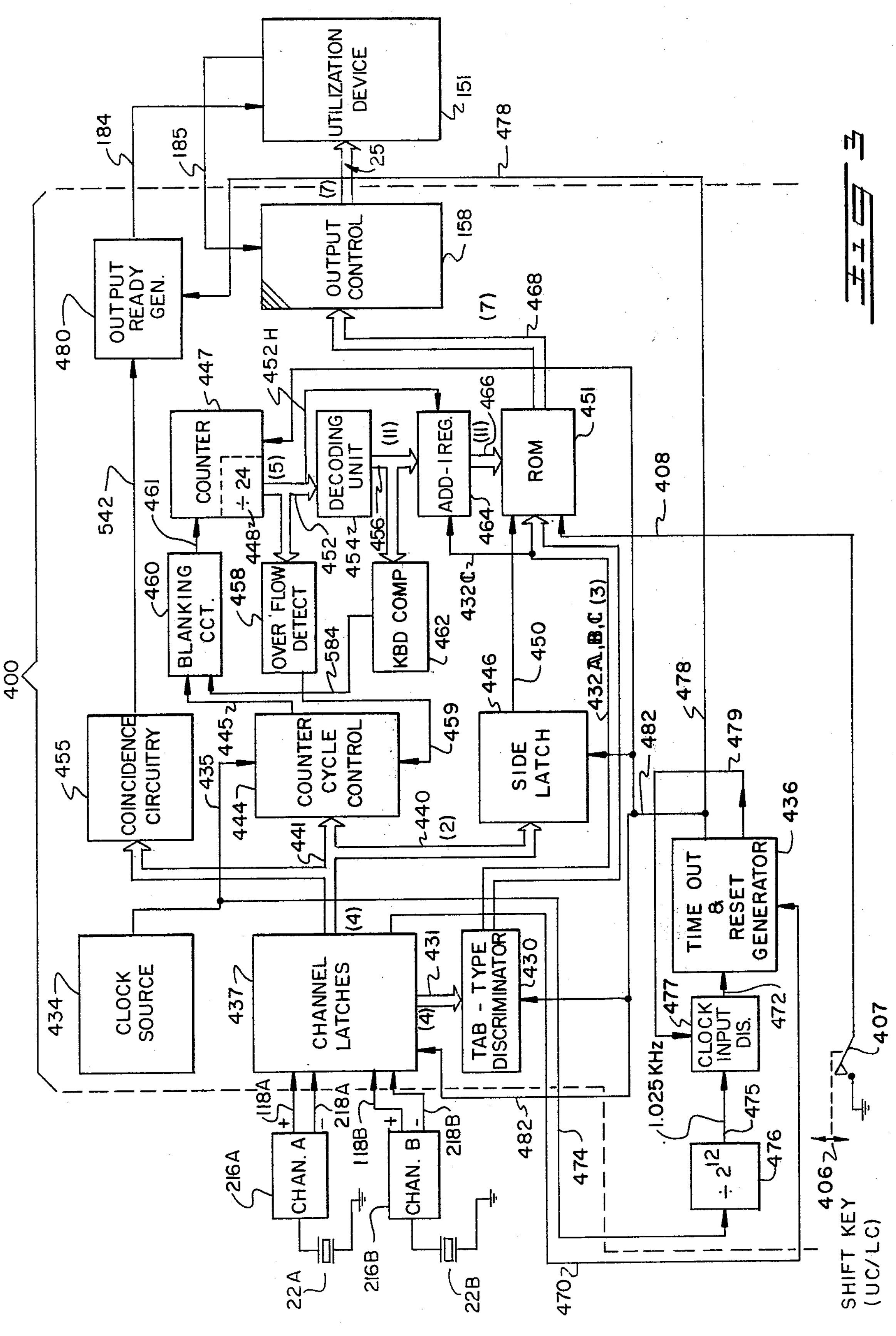
FIG. 3 is a block diagram of an elapsed-time system using the bar of FIG. 1 and the keyboard of FIG. 2.

Bar 420 is exemplary of the design that would be used in the keyboard 402 of a typewriter, where the number of distinct keys is equal to 58 as evident from the typical domestic (American) keyboard 402 shown in FIG. 2. Because of the difficulty of using strikers to implement "bi-modal" keys—those where the rest position indicates one mode and the actuated position indicates another mode—e.g., the half space key 404 ("½" at extreme lower left corner of FIG. 2, or the upper case/lower case control key 406 ("Shift", immediately adjacent to and at right of the half space key 404), and others—the state of such keys is not coded by impact with Bar 420, being detected simply by closure of a respective momentary contact switch such as 407 (as shown in FIG. 3) upon actuation of each of these keys. Accordingly, nine of the sixty-five tabs shown in FIG. 2 are not used for the keyboard shown (but are availed of when it comes to international models—particularly where accents, umlauts, etc. are required).

Bar 420 is similar to that disclosed in prior application III except that the tabs have been shifted left such that the centerline of Bar 420 bisects a type C tab 421 and a further pair 422 of oppositely-oriented "raked" tabs of the polarizing type A and type B have been added at the right end of Bar 420 to give a completely mirror-image structure, the type C tab 421 at the centerline being "shared" by the immediately adjacent sets of raked tabs 221*a*, 221*b* on either side, as can be seen from FIG. 1 or FIG. 2. The mirror-image structure of alternate tabs and this "sharing" of the Central Tab 421 permits the tabs to be separated into eleven identical (relative to the midpoint) successive sets of three tabs on each side of Bar 420, contributing to the desired simplification.

As pointed out in copending application III, because of the large number of Keys 26 and the desired external dimensions of the typewriter, available space between tab tips 25, 225*a*, 225*b* is limited and requires an "overlap" or merged condition with respect to the bases of the obtuse triangles forming adjacent "polarizing" tabs 221*a*, 221*b*, as visible from FIG. 1. This merging causes the apparent source of the signals obtained with these polarizing tabs to be displaced from the actual axial location of the impact point, being more nearly centered in the overlapped bases of the obtuse triangles as exemplified by the single location for each pair shown as dashed lines 410 in FIG. 1. Contrary to the logic structure disclosed in copending application III, here no effort is made to "unmerge" them, the difference in polarity being used to identify the tab type and then select the proper code for the given output of the counter, in a manner to be described subsequently.

An overall view with respect to the circuit and logic aspects will be given before going into the detailed description of the first embodiment of the invention.

Turning then to the block diagram of FIG. 3, the transducers 22A, 22B are shown at left, each being connected to a corresponding signal conditioning circuit 216A, 216B forming what will be termed channel A and channel B in conformity with prior applications I and III. Concerning these transducers, it may be mentioned that they are the longer, more sensitive transucer crystals disclosed in copending application III. As to the signal conditioning circuitry (216A, 216B) this will not be described, being similar to that disclosed in the above-mentioned application III in that it contains elements for detection of negative-going wave fronts in each channel. As stated in that application, the outputs on the lines labeled 118A and 118B and those on lines 218A and 218B are each a series of positive-going pulses identical to the ones described in prior application I except that the pulses on the latter two of the above-mentioned four lines are triggered by initially negative voltage half-cycles.

Figure 6A:
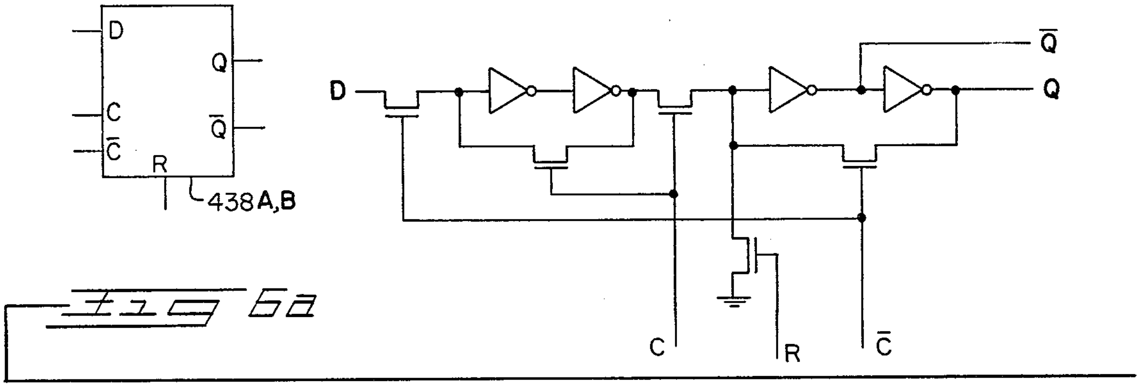
FIGS. 6*a*–6*c* show the configuration of some devices used in the embodiment of FIGS. 5*a*, 5*b*.
Figure 6B:
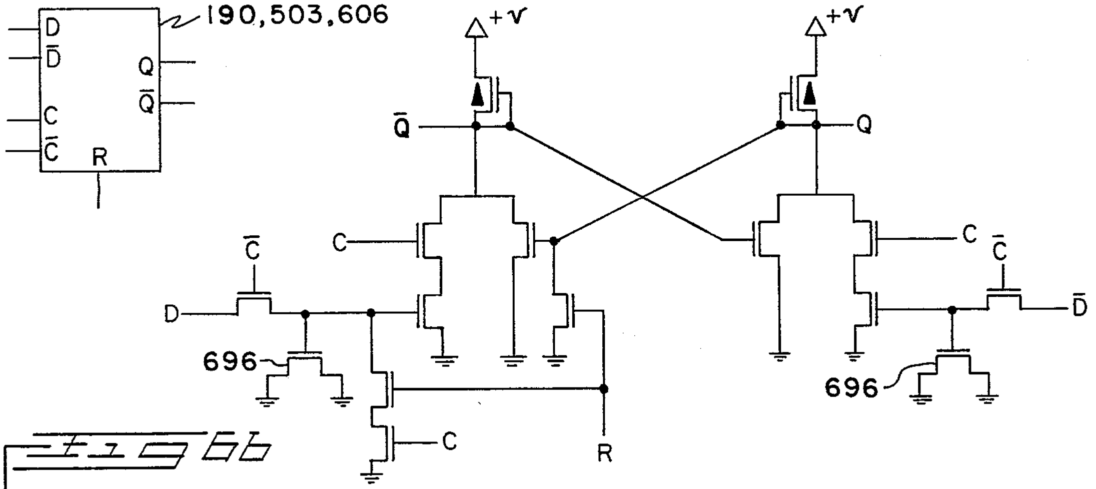
Figure 6C:
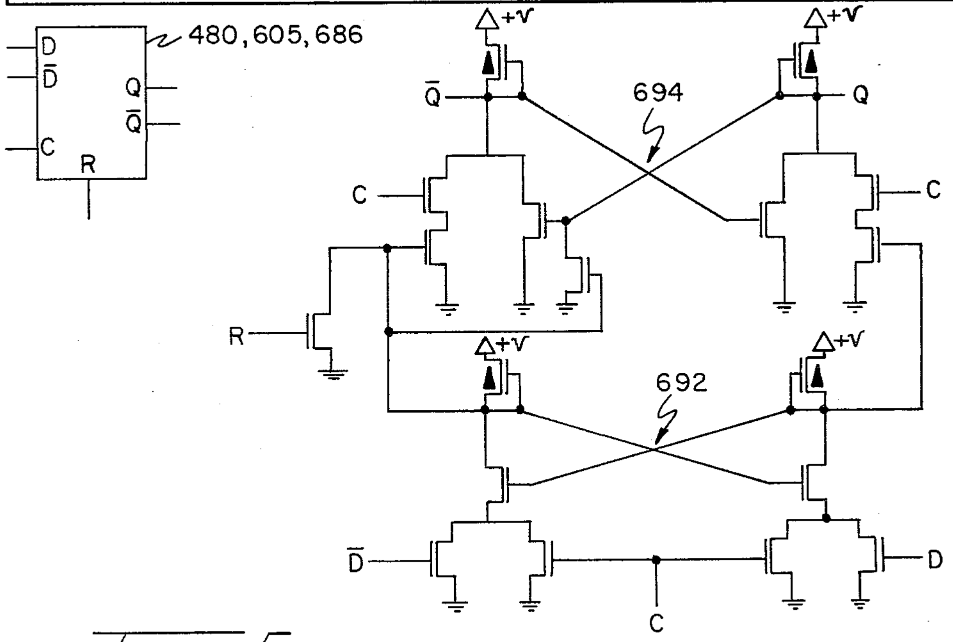

To the right of these elements is shown a logic block 400 identical in part to that labeled 200 in FIG. 6 of prior application III. For that reason, those elements which are equivalent (or substantially the same) have retained the original numbering of the above-mentioned prior applications and have further been marked by heavy diagonal lines at the upper left-hand corner. Newly-introduced or significantly modified elements do not have the lines and bear reference numerals beginning with 400. In a number of instances, gating signals have been derived from sources (including the basic clock source 434 which preferably operates at 4.28 megaherz herein) other than those disclosed in prior applications I and III, where they were generated upon activation (or inactivation) of elements dispensed with in the embodiments of the present invention, mainly for reasons of lower cost. As an example, Positive/Negative Signal Control 202 has been replaced by a Tab-type Discriminator 430 which accepts the same information from Channel Latches 437, but now prepares—corresponding to the positive or negative nature of the initial signals received at the respective transducers 22A, 22B—binary signals to indicate whether the tab struck was of type A, B or C, that information being transmitted directly to an Encoding ROM 451 for selective code conversion of the output of Counter 447, also supplied to ROM 451, but not directly (as will be seen).

The lines 118A and 218A together with lines 118B and 218B are all connected to Channel Latch Circuit 437, the latches in that circuit being of both the simple "Set/Reset" type used in application I, and also of the positive-edge-triggered type of latch such as modules of the 7474 kind associated with wave front polarity detection in application III, but arranged differently herein, as will be described. Just as in the prior applications, presence of a signal in one of the channels (for example, Channel A) causes setting of a corresponding latch (484A) in Latch Circuit 437 with a resultant change in level from low to high at its Q output and a converse change on its complementary or $\overline{Q}$ output and thus on two of a group of four lines 441 which go to a Counter Cycle Control 444. In fashion similar to that described in application I, the input to Counter Cycle Control 444 (somewhat similar in operation to Cycle Time Control 144 of that copending application) initiates counting activity by Counter 447—under control of pulses from Clock Source 434 on line 435—via an output line 445 to a Blanking Circuit 460. This last receives the output on line 445 and controls its supply to Counter 447 via a line 461 connected to the clock input of that counter.

Subsequent appearance of a signal on the other channel (B in this case, but by way of example only, as the wave may be sensed first in either the left or the right channel, depending on the particular location of the key depressed) sets another channel latch in Latch Circuit 437 with corresponding changes on the other two of the four lines 441. This activates Coincidence Circuitry 455 to indicate that the elapsed time interval is now defined—i.e., that counting activity in counter 447 should therefore cease and that an Output Ready Generator 480 should now alert the Utilization Device 151 of the availability of a key code for transmittal. The count in Counter 447 existing at that instant is then held available (already converted to a desired code) for ultimate transmission to Utilization Device 151 at a time determined by this last and in response to a signal applied to Output Control 158 via a control line 185, as before.

As mentioned earlier, in addition to the information provided on Channel Output Lines 441, Channel Latches 437 also provide polarity information to Tab-type Discriminator 430 via a different group of four lines 431. Tab-type Discriminator 430 converts that information into a single output on one of three tab-type output lines 432 A, B, and C connected directly to Encoding ROM 451 as row select lines. ROM 451 also has a couple of other control inputs from Side Latch 446 and Case Shift Key 406.

As seen in FIG. 3, the output of Counter 447 comprises five lines 452, one of these being a "half-bit" line 452H from the high order bit position of a "Divide by 24" subcounter 448 (not shown separately in FIG. 3 because it is actually part of counter 447) which is used for a special purpose described later. The counter output lines 452 go to several places. First of all, they go to a Decoding Unit 454, a circuit which converts the binary value at its input to an inverted output on just one of eleven lines 456 (twelve lines in FIG. 5, although the twelfth does not go to Encoding ROM 451, being used for a special purpose explained later). The binary output lines 452 of the counter also go to an Overflow Detector 458 which is merely part of a gating circuit in Counter Cycle Control 444 responding to a predetermined "maximum allowable" count in Counter 447 to prevent incessant clocking of Counter 447 in case counting activity was initiated by a spurious signal appearing at the output 108A (or 108B) of just one of the transducers 22A, 22B and thus never turned off by receipt of a signal from the other transducer. Also, Blanking Circuit 460 receives an input from a Keyboard Compensation Circuit 462 which—though somewhat similar to that shown in copending application III—operates in a slightly different fashion, causing certain counts to be delayed for one or more clock periods, depending on the sound-propagating characteristics of the particular material used in Bar 420 and under control of signals appearing on the eleven lines 456 at the outputs (inverted) of the Decoding Unit 454, as will be discussed subsequently. This blanking operation resembles that described in copending application III with respect to Counter Halt Circuit 285 of that application, but is used herein with respect to the Keyboard Compensation Circuit to match the counting rate of Counter 447 to Bars 420 where the velocity of sound differs from the norm for the material used.

The output lines 456 of Decoding Unit 454 also go to an "Add-One" circuit 464 (a multi-pole, double throw switch or shift register) and merely connects each of the eleven lines 456 to a corresponding level or to an alternative, next higher level of a like number of lines 466 serving as inputs to Encoding ROM 451 (via binary conversion gating in the embodiment of FIGS. *4a–4d* though direct input is also feasible, as will be shown in the single chip integrated circuit embodiment of FIG. 5), where the information on the selected one of eleven lines 466-n controls provision of the desired seven bit binary output on lines 468. In particular, for a reason subsequently obvious, if the key depressed impacts a type C tab and there is a true signal on the half-bit output line 425H of Counter 447, an upward shift of the information on the lines 456 will occur such that the signal on one line 456-n, say, then appears on a next higher output line 466-(n+1) (i.e., "add one"). The actual code presented on lines 468 is a function not only of the selected one of the lines 466-n but also of the state (true or false) of: tab-type lines 432 A, B, and C; Side Latch Output Line 450, and Case Shift Line 408 (as mentioned earlier).

The interaction of Output Control 158 with Utilization Device 151 is now somewhat different than that disclosed in prior applications I and III because—the information now being held in Counter 447—Output Control 158 no longer needs to incorporate a memory function, providing only gating and isolation. Availability of data on lines 468 is communicated to Utilization Device 151 by a signal along line 184 (as disclosed in the prior applications I and III), Output Control 158 not being activated until a return signal on line 185 from Utilization Device 151 is received to indicate that the coded information can be accepted on data bus lines 25-1 to -7 from Output Control 158.

For greater simplicity, generation of the Reset Signal is now derived from a signal emitted by a combined Time-Out and Reset Generator 436, though still appearing only after an interval sufficient for the induced acoustic waves to dissipate completely. The Time-Out and Reset Generator 436 gives first a signal on line 478 to reset various latches and then, after a short interval, a further signal is emitted on line 479 connected to a Clock Input Disable Circuit 477 to block further operation of Time-Out and Reset Generator 436. The signal on line 478 resets Output Ready Generator 480 and via a line 482 tapped to line 478 returns the remainder of the latches to their reset condition in anticipation of the next key impact on bar 420, an impact which will again be sensed at discrete times by transducers 22A and 22B to define a new cycle of encoding. Sensing of an input from either of these transducers releases the block on Time-Out Generator 436, as will be described later.

Having given a broad overview of the operation of the circuitry and logic elements according to the invention, a detailed description of a first embodiment will be given in particular reference to FIGS. *4a* through *4d,* in which the Signal Conditioning Circuitry 216A, 216B is only shown in block form, being identical substantially (except for changes not relevant to this invention) to that shown in FIG. *7a* of prior application III, there being comparators for purposes of detecting waves having both positive and negative first half-cycles, as discussed in that copending application. This circuity will not be described again, though it should be noted that—as explained more fully in copending application III—while the diverging acoustic waves always give rise also to pulse trains on the polarized output lines 218A, 218B, it is only the initial half-cycle of the first-sensed wave (which may be in either channel), no matter what its polarity may be, which causes the start of a timing cycle of the type briefly described above. Being later, pulses in the opposite polarity train may be ignored. The same comment will be true, of course, for the wave sensed later and effecting the end of the counting cycle.

Because of the mirror-image, tab-centered structure of bar 420, there will be further differences in the circuits of the present invention, which will now be discussed.

As in the prior applications, the appearance of a signal in one of the channels (for example, Channel A—either on line 118A or line 218A) causes the setting of a corresponding "channel" latch 484A of the above-mentioned "Set/Reset" type, there being—in well-known fashion—a change in level at its Q output and a converse change at its complementary or $\overline{Q}$ output. Setting of latch 484A not only causes a change in level from low to high at its Q output on line 483A, but also a corresponding change on line **441*a* tapped to line 483A and connected as one input to a two-input AND gate 490 having its output connected via line 491 to one input of a two-input NOR gate 492, both gates forming part of Counter Cycle Control 444 and the output of NOR gate 492 being the line 445 controlling the cycling of Counter 447. The other input to AND gate 490 is a line 441*d* tapped to line 440B presenting the complementary output ($\overline{Q}$) of a Latch 484B identical in form to Set/Reset Latch 484A, and thus shown only in block form for simplicity. Location of the set and reset inputs in the block form for Latch 484B conforms to the use of cross-coupled NOR gates, the Reset input (R) on line 482 being shown uppermost. As detailed for Latch 484A, line 482 is the second input (normal low) to upper NOR gate 485, which gate has a high level at its output on line 483A (the true output Q) when both inputs are low. The latch then stays in this set state until a high level appears on line 482, this last being connected to the "Reset" portion of Time-Out and Reset Generator 436, as shown in FIG. 3 and described in greater detail subsequently. From the foregoing, it is clear that the output of AND gate 490 on line 491 will be high only if latch 484A is set, provided latch 484B is still in its reset state (Q on line 440**B being high).

A similar two-input AND gate 493 has input from lines 441*b* and 441*c*, the former being tapped to line 440A ($\overline{Q}$ output of latch 484A) and the latter being tapped to line 483B (Q output of latch 484B). Accordingly, the output of AND gate 493 on line 494—connected to the other input of NOR gate 492—will be high only if latch 484B is set and latch 484A is in its reset state (Q output high). The output of NOR gate 492—that is, line 445 of Counter Cycle Control 444—will be at a high level if neither AND gate 490 nor AND gate 493 is ON (a low level being present on both output lines 491 and 494). This condition is met if either latch 484A or latch 484B is set, but not if both are in the set state or both in the reset state. Line 445 is the Start/-Stop control for Counter 447, its signal output actually being of inverted logic: high when an output has not been sensed at either transducer 22A or 22B, low when an output has been sensed at one of these transducers, and high again when an output is subsequently sensed at the other transducer.

Figure 4A:
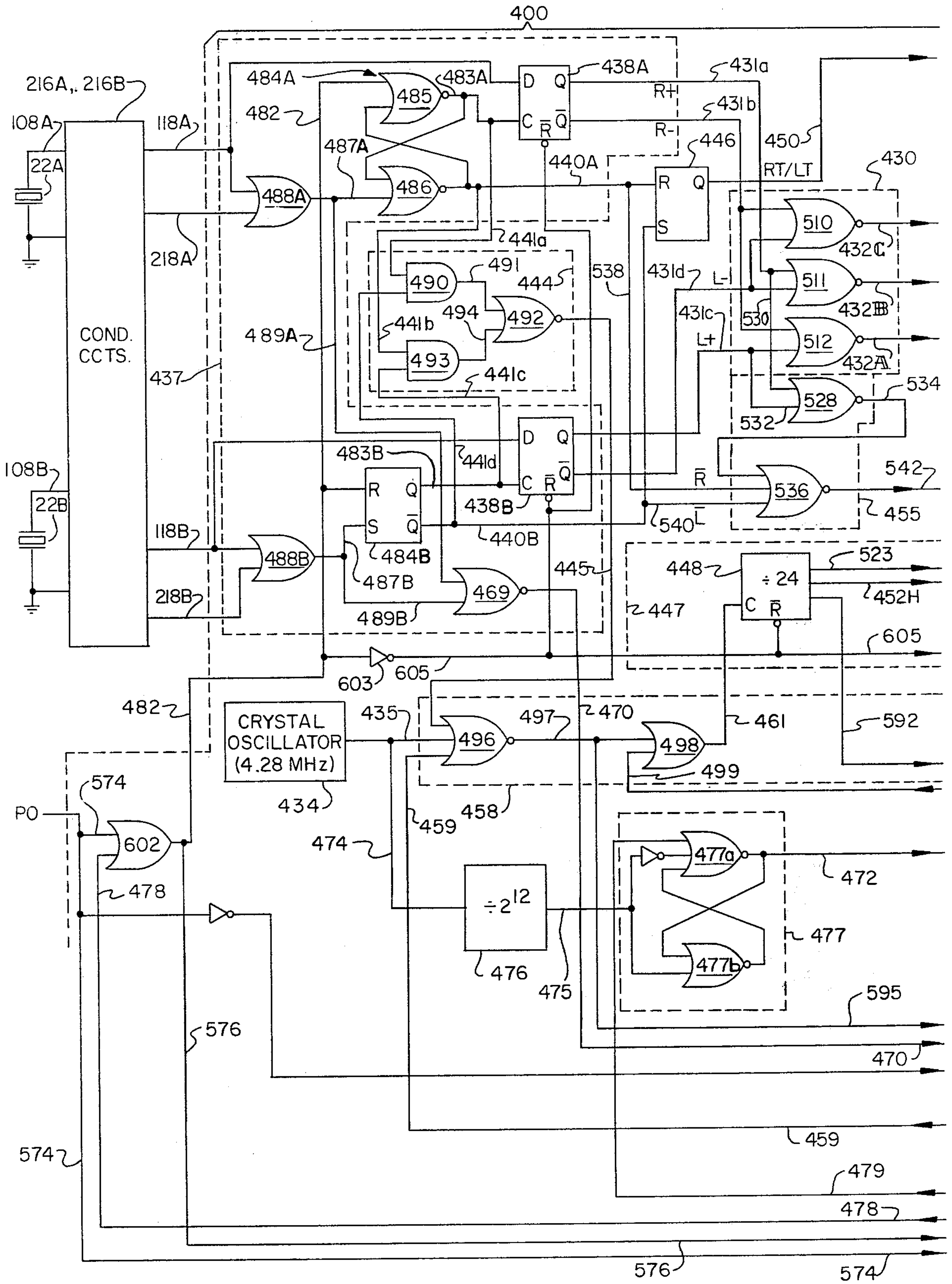
FIGS. 4*a* through 4*d* present a detailed schematic of the electronic portion of the modified apparatus of FIGS. 3*a*, 3*b* in a first embodiment using commercially available components.
Figure 4B:
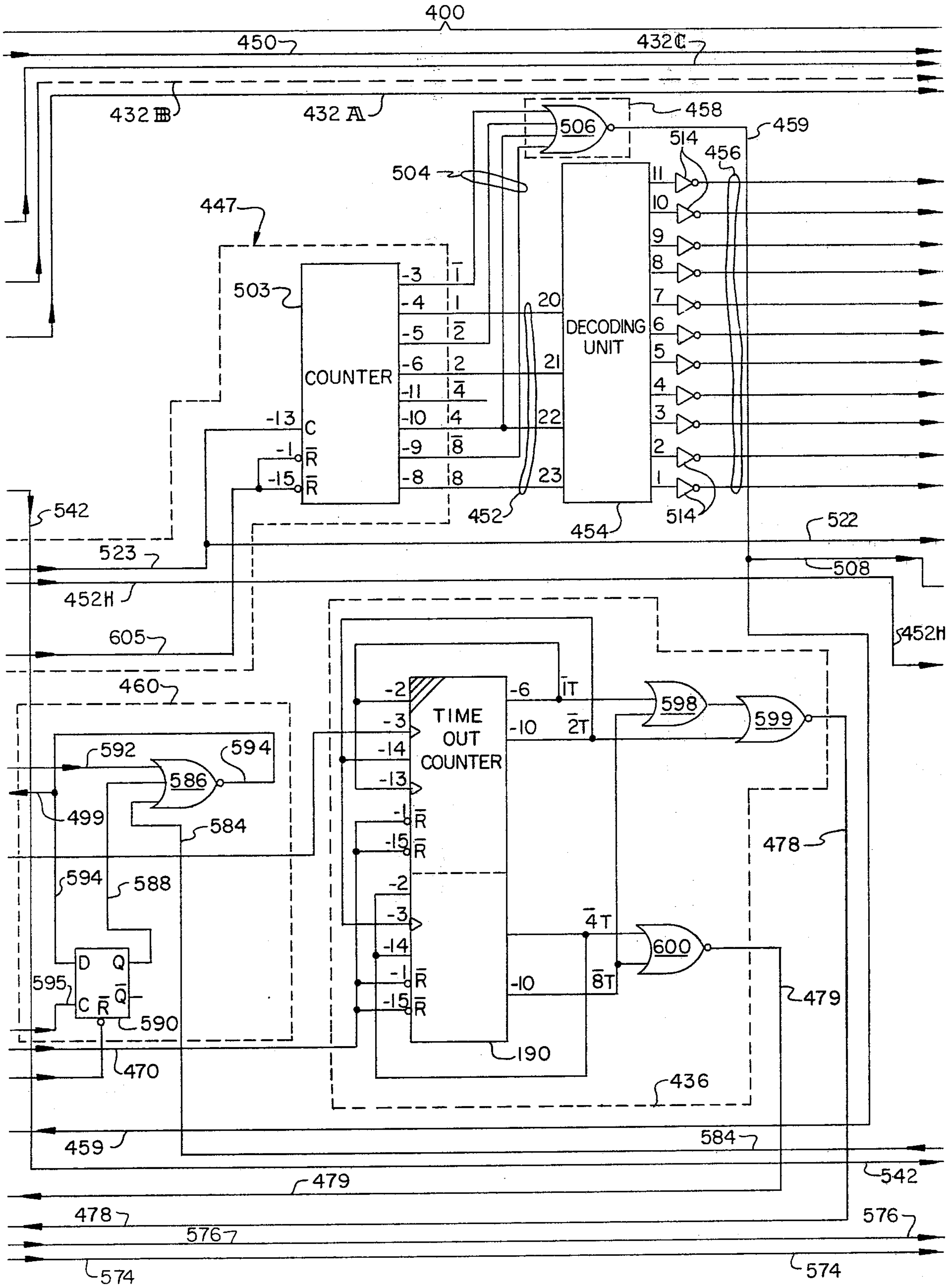

In FIG. 4*a* it is seen that line 445 is one input to a three-input NOR gate 496 which may be termed the "Clock Pulse Gate" and is the actual control point for cycling of Counter 447. The other two inputs of NOR gate 496 are the line 435 from the basic timing source 434 (a crystal oscillator with a frequency of 4.28 MHz), and a line 459 on which a high level is indicative of the appearance of a count of eleven on the four most significant bit lines of five-line output 452 of Counter 447. This particular count is not present initially (Counter 447 being reset at the end of each key entry cycle) and represents the full measure of the number of tab sets (a type C tab together with a merged pair of type A and type B tabs forming each "set" as mentioned earlier) between the midpoint and the furthest tabs on either side of bar 420 (see FIG. 2). When this count is reached, it indicates that Counter 447 has overflowed; further cycling being erroneous, it must be inhibited.

Returning now to "Clock Pulse" gate 496 for controlling the cycling of Counter 447, from FIG. 4*a* it is evident that the output of that gate on line 497 passes to one of two inputs of an OR gate 498 forming part of Blanking Circuit 460, the second input of gate 498 being a line 499 described in greater detail subsequently.

OR gate 498 is connected via line 461 to the clock input C of a "Divide-by-24" Subcounter 448 (shown only in block form in FIG. 4*a* because such counters are well-known in the art, being realizable from full binary counters by gating to nullify counts, block input pulses or advance pulses to intermediate stages, or the like; a specific form being shown in FIG. 5 and described later). Subcounter 448 forms part of Counter 447, but counts only fractional bits, i.e., the less significant ones to the right of the binary point in a binary number having both fractional and integral bits representing the number of clock pulses counted. Subcounter 448 has the complementary output ($\overline{Q}$) of the most significant bit position connected to line 523 serving—in turn—as the clock input of the main part (integer bits) of Counter 447, which part is a 4-bit hexadecimal set of Counter Stages 503 having both true and complementary outputs for each bit. The true outputs of Counter Stages 503 are presented to Decoding Unit 454 on lines 452 prior to Encoder ROM 451, as will be discussed subsequently. To prevent uncontrolled cycling, the complementary outputs for the least two significant bits, the true output of the next most significant bit, and the complementary output of the most significant bit (i.e., $\overline{1}$, $\overline{2}$, 4 and $\overline{8}$ outputs) are presented on another set of four lines 504 to a NOR gate 506 generating the signal "OVF" on line 459 when the output of Counter Stages 503 is the binary equivalent of eleven—i.e., when Counter Stages 503 "overflow" as mentioned briefly earlier and discussed more fully later.

Because of the presence of polarizing tabs 221*a*, 221*b*, which gave rise to waves having positive or negative initial wave fronts, the Channel Latch Circuit 437 again includes latches for polarity indication—the state of these latches revealing whether the signal on the given channel had a positive initial half-cycle or a negative initial half-cycle. For purposes of the present invention, however, the arrangements are slightly different (for reasons of lower cost and better utilization of space on the chip where realized on a single chip, as will be discussed subsequently in connection with FIG. 5). As seen in FIG. 4*a*, Circuit 437 comprises a latch 438A—called hereinafter the "positive wave front latch" of Channel A because this latch is set only if the initial output in Channel A appears on line 118A from the positive wave front detecting portion of Conditioning Circuit 216A. The data input D of Latch 438A is connected to line 118A and thus that input is at high level only when a pulse appears on line 118A in response to actuation of Key 26. The clock input C of Latch 438A is connected, however, to line 483A at the Q (true) output of previously-mentioned Channel A latch 484A—a simple "Set/Reset" latch comprised of a pair of two-input NOR gates 485, 486 crosscoupled in known fashion. "Set" input 487A to gate 486 is linked to the output of a two-input OR gate 488A which merges the signals on lines 118A and 218A, a pulse on the former line indicating a positive half-cycle of an acoustic wave and a pulse on the latter line indicating a negative half-cycle of that wave, thus identifying the polarity of the wave front if the pulse is first to be emitted. Accordingly, if the wave sensed in Channel A has a positive initial half-cycle or wave front, Latch 438A is set by the initial pulse from line 118A via the setting of Latch 484A and the output Q on line 431*a* goes high, the $\overline{Q}$ (complementary) output of Latch 438A on line 431*b* accordingly going low. This combination of signals on the respective lines is an indication that the tab impacted was either a type A or a type C. Setting of Latch 484A by the pulse on line 118A corresponding to the positive initial half-cycle which precedes the similar output on line 218A in response to the negative second half of that cycle precludes a further clocking of Latch 438A until Latch 484A is reset—i.e., until the end of the key entry cycle.

If, conversely, the wave detected in channel A had a negative initial half cycle—this being detected by the respective comparator in Conditioning Circuit 216A (not shown) and generating a clock pulse for latch 438A via line 218A, OR gate 488A and output line 483 of NOR gate 485—Latch 438A would not be set because its data input D would be low at the instant the clock pulse occurred. The clock pulse would again signify the setting of Latch 484A such that detection of the succeeding positive half-cycle by the other comparator (also not shown) of Conditioning Circuit 216A could not clock Latch 438 via the input from line 118A to OR gate 488A. The high level at the complementary output Q (line 431*b*) and a low level at the true output $\overline{Q}$ (line 431*a*) indicate that the wave detected on Channel A had a negative initial half-cycle. This combination only occurs with a type B tab. It is particularly noted that though a high level on lines 431*b* and 431*d* (low level on both lines 431*a*, 431*c*) is theoretically possible, the tab structures of FIG. 1 are such as to result in only one of these lines being high in response to a key depression, both never being high under normal conditions of use. If such is detected, the signals are invalid and to be disregarded, as will be seen.

From the foregoing, it is clear that Latch 438A serves as the indicator of polarity according to the level on its respective output lines 431*a* and 431*b*, the former of which is high if a positive wave front was detected and low otherwise, and vice versa for the latter output line. Further, it will also be clear from FIGS. 4*a* through 4*d* (together with the more detailed explanation in copending application III) that the pulse train outputs on either of the lines 118A, 218A causes the related Latch 438A to be clocked and set (or not set, if a negative wave front), at the leading edge of the first pulse of that train. In sum, the level on line 431*a* (or 431*b*) serves as an indicator of polarity for Channel A, being high if a positive wave front was detected and low otherwise (vice versa for line 431*b*). Either line may thus be used for that purpose according to expediency.

Operation of the "channel" Latch 484B (Set/Reset type) and the "positive wave front latch" (sampling type) 438B of Channel B being identical to that described above, these latter two will not be discussed other than to note that—in fashion similar to the above—a high level on line 431*c* from output Q of latch 438B indicates a positive initial half-cycle for the wave detected in channel B, while a low level at that output indicates a negative initial half-cycle (the opposite states of the complementary output $\overline{Q}$ of Latch 438B on line 431*d* giving the same indication, as obvious). Lines 431*c*, 431*d* therefore serve as the polarity indicators for Channel B.

Proceed next with discussion of the use of the polarity information as shown in FIG. 4*a*. The four lines 431*a–d* which bear the polarity information are connected to three NOR gates 510, 511 and 512 which together form the Tab-Type Discriminator 430. Gate 510 is connected to lines 431*b* and 431*d*, Gate 511 is connected to lines 431*a* and 431*d*, while Gate 512 is connected to lines 431*b* and 431*c*. Because of the negation, NOR gate 510 introduces a high level on output line 432 C only if there is no signal on line 431*b*—i.e., Latch 438A is in its set state—and there is also no signal on line 431*d*—corresponding likewise to the set state of latch 438B. Accordingly, there is a high level on the output line 432C if both latch 438A and latch 438B are set, as they would be for impact upon a type C tab. Similarly, NOR gate 511 gives a high output if there is no signal on line 431*a* (Latch 438A is in the reset state), and if there is no signal on line 431*d* (Latch 438B is in its set state). This corresponds to a negative initial half-cycle from transducer 22A and a positive initial half-cycle from transducer 22B, a combination that obtains only if the tab struck is of type B. A high level would thus appear on the line labeled 432B which forms the output of NOR gate 511. A high level on line 432A connected to NOR gate 512 follows in similar fashion. The lines 432A, B and C are connected directly to the control inputs of ROM 451. (Actually, only two of the three are needed in the embodiment based on commercial devices.)

Figure 4C:
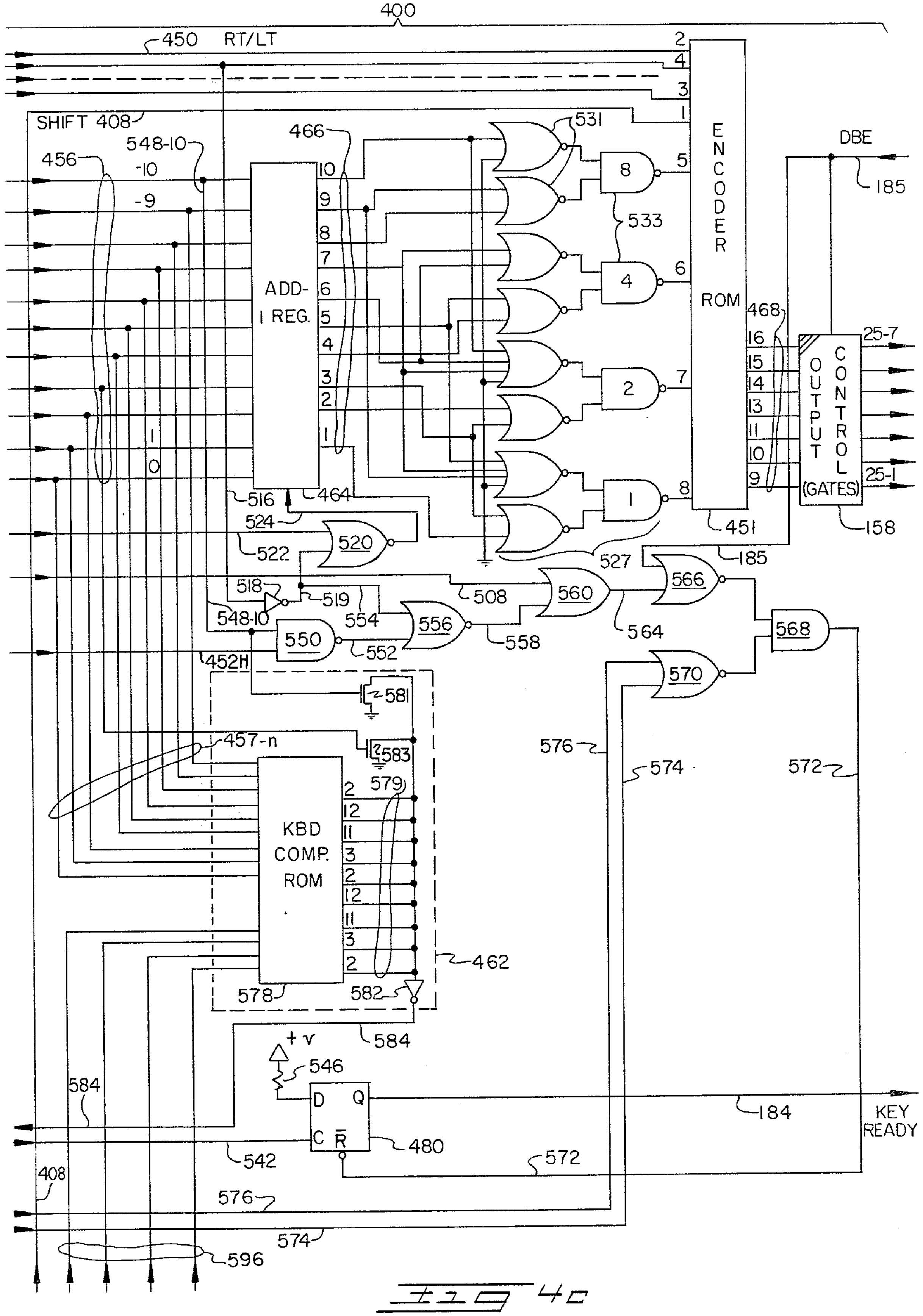

In addition to the polarity information supplied to the Encoder ROM 451, the side information—that is, the indication as to whether the tab struck is to the right or to the left of the midpoint of Bar 420—is also supplied to that ROM as a signal on line 450 from the Side Latch 446 (equivalent to "MSB" Latch 146 of copending applications I and III, but renumbered and renamed because there is no longer a relation between a given side of Bar 420 and the state of the most significant output bit—Bus line 25-7). As seen in FIG. 4*a*, Side Latch 446 is also of the set/reset variety, with the Set input connected to line 440B from the $\overline{Q}$ output of Channel Latch 484B. The Reset input R is connected to line 440A coming from the $\overline{Q}$ or complementary output of Latch 484A. Thus, if the tab struck is on the right side, a pulse will appear first on line 118A (or 218A, if a negative wave front), such that Latch 484A will be set and the signal on line 440A will disappear, with the result that only the Q output of Latch 484B will be high. Since this output is connected by line 440B to the Set input of Side Latch 446, this last will be set and its output on line 450 will be at a high level. FIG. 4*c* shows line 450 to be connected as another control input to Encoder ROM 451. One other control input to ROM 451—namely, the upper case/lower case signal on line 408—has been discussed previously and nothing further need be said at this point.

As a preliminary to discussion of the actual encoding, it is desirable to consider the following Table I prepared for the case where Utilization Device 151 is the print control portion (not shown, but known) of an electronic typewriter using a print wheel ("daisy," not shown, but well-known) with 88-90 individual print elements distributed around its periphery (which includes several open locations for print line visibility when the print wheel is at a "home" position). Table I summarizes the conditions of the control inputs to Encoder ROM 451 and the desired codes to be placed on the seven data bit output lines 468 of that encoder for ultimate transmission to the print control (151) via Output Control 158 and Data Bus Lines 25-1 to 25-7. For ease of understanding, in this table the output codes are expressed in decimal characters—which either identify a function (such as "tab set" or "carrier return," etc.) or identify the clockwise location on the print wheel for the character corresponding to the key depressed. Obviously, though, the codes are transmitted in the machine as the seven binary bits developed on lines 468.

Not all of the keys on Keyboard 402 are included in Table I because this table is by way of example only: the number of keys and their designation or particular location being a matter of choice and depending on whether a typing machine is intended for the U.S. market or for a foreign market.

TABLE I

| TAB | TYPE | PULSE COUNT | SIDE | SHIFT | KEY ACTUATED | COUNTER 447 (452-452H) | OUTPUT CODE |
|---|---|---|---|---|---|---|---|
| 1 | A | 240–263 | 0# | 0# | C.T.* | 10 ≦ n < 11** | 114 |
| | | | | 1 | " | | " |
| 2 | B | 240–263 | 0 | 0 | M.R. | 10 ≦ n < 11 | 101 |
| | | | | 1 | " | | " |
| 3 | C | 228–251 | 0 | 0 | S.T. | 9.5 ≦ n < 10.5 | 113 |
| | | | | 1 | " | | " |
| . | | | | | | | . |
| . | | | | | | | . |
| 6 | C | 204–227 | 0 | 0 | Tab | 8.5 ≦ n < 9.5 | 115 |
| | | | | 1 | " | | " |
| . | | | | | | | . |
| . | | | | | | | . |
| 10 | A | 168–191 | 0 | 0 | 1(one) | 7 ≦ n < 8 | 79 |
| | | | | 1 | ! | | 83 |
| 11 | B | 168–191 | 0 | 0 | SPC | 7 ≦ n < 8 | 100 |
| | | | | 1 | " | | " |
| 12 | C | 156–179 | 0 | 0 | q | 6.5 ≦ n < 7.5 | 62 |
| | | | | 1 | Q | | 52 |
| 13 | A | 144–167 | 0 | 0 | a | 6 ≦ n < 7 | 6 |
| | | | | 1 | A | | 34 |
| 14 | B | 144–167 | 0 | 0 | 2 | 6 ≦ n < 7 | 61 |
| | | | | 1 | @ | | 80 |
| 15 | C | 132–155 | 0 | 0 | z | 5.5 ≦ n < 6.5 | 60 |
| | | | | 1 | Z | | 23 |
| ≈ | | | | | | | ≈ |
| 28 | A | 24–47 | 0# | 0# | t | 1 ≦ n < 2** | 4 |
| | | | | 1 | T | | 22 |
| 29 | B | 24–47 | 0 | 0 | g | 1 ≦ n < 2 | 30 |
| | | | | 1 | G | | 12 |
| 30 | C | 12–35 | 0 | 0 | 6 | 0.5 ≦ n < 1.5 | 21 |
| | | | | 1 | ¢ | | 89 |
| 31 | A | 0–23 | 0 | 0 | b | 0 ≦ n < 1 | 39 |
| | | | | 1 | B | | 25 |
| 32 | B | 0–23 | 0 | 0 | y | 0 ≦ n < 1 | 40 |
| | | | | 1 | Y | | 18 |
| 33 | C | 0–11 | 0 | 0 | h | 0 ≦ n < 0.5 | 70 |
| | | | 1 | " | " | | " |
| | | | 0 | 1 | H | | 49 |
| | | | 1 | " | " | | " |
| 34 | A | 0–23 | 1 | 0 | 7 | 0 ≦ n < 1 | 33 |
| | | | | 1 | & | | 41 |
| 35 | B | 0–23 | 1 | 0 | n | 0 ≦ n < 1 | 54 |
| | | | | 1 | N | | 36 |
| 36 | C | 12–35 | 1 | 0 | u | 0.5 ≦ n < 1.5 | 19 |
| | | | 1 | 1 | U | | 11 |
| 37 | A | 24–47 | 1 | 0 | j | 1 ≦ n < 2 | 27 |
| | | | 1 | 1 | J | | 9 |
| 38 | B | 24–47 | 1 | 0 | 8 | 1 ≦ n < 2 | 63 |
| | | | 1 | 1 | * | | 44 |
| . | | | | | | | . |
| ≈ | | | | | | | ≈ |
| . | | | | | | | . |
| 51 | C | 132–155 | 1 | 0 | / | 5.5 ≦ n < 6.5 | 77 |
| | | | | 1 | ? | | 50 |
| 52 | A | 144–167 | 1 | 0 | ½ | 6 ≦ n < 7 | 87 |
| | | | | 1 | ¼ | | 86 |
| 53 | B | 144–167 | 1 | 0 | ' | 6 ≦ n < 7 | 75 |
| | | | | 1 | " | | 69 |
| 54 | C | 156–179 | 1 | 0 | = | 6.5 ≦ n < 7.5 | 48 |
| | | | | 1 | + | | 46 |
| . | | | | | | | . |
| . | | | | | | | . |
| 7 | C | 180–203 | 1# | 0# | ) | 7.5 ≦ n < 8.5** | 88 |
| | | | | 1 | ( | | 85 |
| 58 | A | 192–215 | 1 | 0 | BSPC | 8 ≦ n < 9 | 110 |
| | | | | 1 | " | | " |
| 59 | B | 192–215 | 1 | 0 | RTN | 8 ≦ n < 9 | 116 |
| | | | | 1 | " | | " |
| . | | | | | | | . |
| . | | | | | | | . |
| 62 | B | 216–239 | 1 | 0 | IND | 9 ≦ n < 10 | 102 |
| | | | | 1 | " | | " |
| 63 | C | 228–251 | 1 | 0 | S.L.M. | | 107 |
| | | | | 1 | " | | " |
| 64 | A | 240–263 | 1 | 0 | COR | 10 ≦ n < 11 | 109 |
| | | | | 1 | " | | " |
| 65 | B | 240–263 | 1 | 0 | S.R.M. | 10 ≦ n < 11 | 106 |

TABLE I-continued

| TAB | TYPE | PULSE COUNT | SIDE | SHIFT | KEY ACTUATED | COUNTER 447 (452-452H) | OUTPUT CODE |
|---|---|---|---|---|---|---|---|
| | | | | 1 | " | | " |

*NOTE:
BSPC = Backspace
COR = Correct
C.T. = Clear Tab
IND = Index (linefeed)
M.R. = Margin Release
RTN = Carrier Return
S.L.M. = Set Left Margin
SPC = Space
S.R.M. = Set Right Margin
S.T. = Set Tab
**Symbology:
$\leq n$ = "less than or equal to n"
$< n$ = "less than n"
#Control bits:
Side "0" = LEFT SIDE OF BAR 420
"1" = RIGHT SIDE OF BAR 420
Shift "0" = LOWER CASE
"1" = UPPER CASE Proceeding from top to bottom in column 1 in the above table (left to right in FIGS. 1 and 2), it is seen that the tabs are numbered consecutively beginning at the left side—i.e., a type A tab (furthest left in FIG. 1) is first in the series and corresponds to the Clear Tab Key 403 shown in FIG. 2, while the second tab (a type B) corresponds to Margin Release Key 405, and the third (type C) corresponds to the "Set Tab" Key 409. The next two tabs are not used with the keyboard of FIG. 2, so the table skips to the sixth tab (type C), corresponding to the Tabulation ("Tab") key 411 which initiates tabular motion of the print element carrier (not shown, but known). The next three tabs on Bar 420 are likewise not used for the keyboard of FIG. 2. The table then continues with the 10th through 15th tabs and, for brevity, skips thereafter to the 28th tab, resuming the listing of the control information until the 33rd tab which is seen to be at the centerline, since it is of type C and specifically identified as corresponding to Tab 421 at the midpoint of Bar 420. This is revealed in the third column, which indicates the range of pulse counts to be expected with the given type of tab and location on a standard bar, the term "standard" here being used to indicate a bar having a sonic velocity within the expected range for the material (other bars exhibiting higher or lower velocity than this, will yield the same counts but only by use of the "Compensation Circuits" 462 mentioned earlier and described briefly later).

The pulse counts in this third column show a range of 24 between the lowest and the highest count for each tab, noting furthermore that the range is identical for adjacent type A and type B tabs (their bases being merged as will be recalled). The spread in count for the type C tabs is the same, however the average value for that type is slightly under the lowest value of the range for the nearest type A/B tabs to the left of a given type C tab and slightly higher than the highest value of the range for the nearest type A/B tabs to the right of that same type C tab. This is perhaps more clearly revealed if one compares the values in the seventh column—headed "Counter 447 (452-452H)"—which shows a range of counts comparable to those given in column three, but after division by twenty-four—e.g., for the first and second tabs: $10 > n < 11$; for the third tab (type C): $9.5 \leq n < 10.5$. All three values, however, are seen to fall in the range of about 10—being less than eleven, but greater than or equal to 9.5. With that in mind, it is clear that, given a count of such magnitude obtained from Counter 447, then indication of the tab type (A, B or C) is sufficient (restricting oneself, for the moment, to the left side of bar 420 and lower case) to control proper selection of the desired output code. Specifically, if a type A key was struck under the above conditions, that indication would militate selection of output code "114" (decimal) only. Conversely, if the tab struck was found to be a type B, then only the code "101" (decimal) should be selected. Lastly, if a type C tab was recognized, then the output code should be "113" (decimal), yet as seen from Table I, under some conditions of temperature and other factors, the integral output of Counter 447 might only have a "9" as the whole number rather than the desired value of "10" for that group. By sensing the state of the bit (signal on line 452H) to the right of the binary point in the binary representation of the output of Counter 447, one can determine, however, whether or not the counter output is actually closer to the next higher integer. If that bit is "true'"—i.e. a logical ONE, line 452H being at a high level, therefore—then, by changing the integral counter output up to the next integer (a "10" in this example), the same number clearly can be used for encoding all three of the tab inputs, thus greatly reducing the necessary logic elements. Note that if the line 452H is low (ZERO in bit to right of the binary point), the integral output of Counter 447 is already at the correct (higher) value, no increase being needed.

As seen in the fourth and fifth columns of Table I, the side and upper case/lower case shift information also are of significance except for the function keys striking tabs 1-3, 6 and 11. At the eighth column of Table I, these last show the same code output regardless of whether one is in upper case or lower case, as is customary with typewriters. With the alphanumeric keys, on the other hand, change from lower case to upper case corresponds to a change from one position to another on the printing "daisy" and this is reflected in the different output codes obtained upon case shift, as shown in the eighth column of Table I.

The tabs numbered 34-65 are located on Bar 420 to the right of its midpoint and accordingly the side information changes there to a "true" or logical ONE representation. Further than that, it is seen that the pulse counts in column three now progress upwards, inversely to the descent of the pulse counts for the tabs on the left side of Bar 420, there being complete symmetry of the tab positions about the midpoint of Bar 420, recalling again that the merged condition for adjacent A and B tabs results in identical pulse counts for each.

Having noted the above, one may proceed to compare tabs from the midpoint outward. For example, considering tab "33" (type C tab 421) in conjunction with tabs "32" and "31" (type A/B to its left or upward in Table I), it is seen that the integer "zero" can be associated with these three tabs. In similar fashion tab "33" and tabs "34" and "35" to its right can likewise be represented by this same integer with the sole distinction that the side information will now be "true" or a logical ONE, as mentioned above. In particular, it may be noted that the thirty-third tab 421, being shared by the type A/B tabs to each side of it, disregards the side information and always selects the letter h (lower case) if the $\overline{\text{Shift}}$ Signal is present on line 408, or upper case H if the $\overline{\text{Shift}}$ Signal is absent from that line. The output codes are generally dependent on the side information except for this one tab.

On the right side of Bar 420, the tabs numbered from "39" through "50" have also been omitted from Table I as merely repetitious but can be developed from the information given above based on the relative locations of the keys on Keyboard 402, recalling that those which strike adjacent type A and type B tabs have identical pulse counts because of the merging mentioned earlier. The tabs "60" and "61" are further spare positions with respect to domestic keyboard 402, and thus are likewise excluded in the table.

It may also be reiterated at this point that because of the mirror-imaged (also tab-centered) structure according to the invention, the tabs at a given distance d from the centerline of Bar 420 are of the same shape regardless of the side, being either a type C or a merged type A/B structure, the single count for the same tab (or, more precisely, "tab set") on either side permitting significant simplification of the encoding, a factor particularly important when implementation of electronic controls as a single integrated circuit chip is concerned (as subsequently discussed with respect to FIG. 5).

Turning now to encoding of the outputs from lines 452-452H of Counter 447 in FIGS. **4*b* and 4*c*, there it is seen that the outputs of the higher order (integer) bits of Counter 447 (Counter Stages 503) on the four lines 452 are supplied to a Decoding Unit 454 which converts the binary count to a 1-out-of-N output in known fashion and as briefly discussed previously. Decoding Unit 454 may preferably be a unit such as a 74C154 IC package obtainable, say, from National Semiconductor Corp. of Santa Clara, Calif. Because it is of the C-MOS structure with inverted logic, the output signals at pins 1 through 11 are complementary and accordingly each must be passed through a respective Inverter 514 to yield the decomplemented signal. Each Inverter 514 is joined to Add-One Register 464 through a respective line 456-n. Each line 456-n is also tapped by a corresponding line 457-n for purposes of controlling the Keyboard Compensation Circuit 462**, but this will be discussed later.

As seen in FIG. **4*c*, line 432C (at a high level when a tab of type C has been identified as the one struck) is tapped by a line 516 which passes through an Inverter 518 to a two-input NOR gate 520. The other input to NOR gate 520 is a line 522 tapped to line 523 from the $\overline{Q}$ output of the most significant bit state of "Divide by Twenty-Four" Subcounter 448 used to clock Counter Stages 503 which provide the integer bits of Counter 447, as previously described. Thus, with the most significant bit output of Subcounter 448 true—i.e., a high signal on 452H indicating the fractional bits of count n to be ≦0.5—the complementary ($\overline{Q}$) output on line 523 will be at a low level. If the input on line 519 (inverted output of line 516) is also at a low level—indicative of striking a type C tab—then, both inputs to NOR gate 520 being low, that gate will have high level on its output line 524, the "Transfer" control for Add-One Register 464. Line 524 being high, all input lines 456 will be connected in known fashion to the next higher one of the corresponding output lines 466 interconnecting Add-One Register 464 and the data input terminals of ROM 451 through binary reconversion gating 527 in this first embodiment. The binary gating 527 includes—in well-known fashion—several NOR gates 531 with inputs selectively connected to lines 466 and outputs connected in pairs (generally) to respective NAND gates 533 having their outputs connected to terminals (or "pins") 5 through 8 of ROM 451. The output of the NAND gate 533 connected to pin 5 has a binary weight of 8, as indicated by the number within the body of the gate symbol. Each of the other NAND gates is connected to a pin assigned a binary weight designation by the number in the corresponding symbol in identical fashion. Accordingly, if the output of Add-One Register 464 shows a high level on line 466-7, for example, then through the respective NOR gates 531 connected to NAND gates 533-4, 533-2 and 533-1, the binary code for a count of seven in Counter Stages 503 (or a count of six with impact on a type C tab and a low level on line 523 to cause transfer by Add-One Register 464, as described) is applied in the form of high levels to pins 6, 7 and 8 of ROM 451 with an appropriate output on lines 468 in accordance with the control inputs as to side, tab type, and case on pins 1 through 4. Note that an input corresponding to impact against a type B tab is not actually necessary because commercially-available units suitable for use as ROM 451 (one such being identified subsequently) provide a different output code for each additional level (bit order) of input information. Accordingly, line 432B is shown in broken form to indicate that it is dispensable for the embodiment of FIGS. 4*a*-4*d***.

Recall that Table I shows the output of Counter 447 (Column 8) for type C tabs to be counts ranging over values with the integer portion differing by unity from the integer for the adjacent type A and B tabs of the "set," to an integer equal to that one, at most. Further, the bit to the right of the binary point (i.e., the complement of the signal on line 523) is "true" when the lower value integer is in question, and false when the higher value integer is obtained, as stated earlier. Thus, upon sensing selection of a key which struck a type C tab and resulted in a count involving the true state of the bit to the right of the binary point (line 523 being low, as required because of the inversion by NOR gate 502), there is transfer by Register 464 with the line 466−(n+1), which designates the higher value integer, being selected for output (i.e., consistent with the selection made upon striking the adjacent type A, type B tabs of the "set").

In any event, the overall result is the provision of a single number to the Encoder ROM 451, the same number for all three tabs of a set. That number, together with identification of: the side struck, the case shift status (lower case except if there is prior depression of Shift Key 406 by the operator), and the type of tab struck (as determined by the above-described logic on lines 432A, B, and C) is sufficient for encoding depression of any one of three keys in a set. The simplification achievable is then obvious. (Compare the four ROMS, two parallel adders, and two output latches of copending application III.)

As an example, if the "Q" key 526 in FIG. 2 were struck, with a resultant pulse count of 158, say, for that particular bar (ambient temperature and other factors have a bearing upon the counter outputs obtained with the Keyboard 402 of a particular machine, as pointed out in copending application III), then the output of Counter 447 on lines 452–452H would be 6.625 for n in Column 8 of Table I and thus greater than 6.5. Accordingly, while the output of Decoding Unit 454 on line 456-6 would be high, input to ROM 451 would not occur through the corresponding line 466-6. Instead, because of the "transfer" signal on line 524 (output of NOR gate 520), the high level would appear on line 466-7 and the output code (lines 468) would then be (Col. 8 of Table I) the binary equivalent of 62 (if the "Q" key 526 were struck without prior depression of Shift Key 406), since key 526 is on the left side and impacts a type C tab. In this instance, the binary output of ROM 451 on the seven lines 468 would be, in descending order of binary weight: 0111110. On the other hand, if Shift Key 406 had been depressed beforehand, then the output code would be the binary equivalent of 52 (Col. 8 of Table I) or 0110100, as will be clear to those skilled in the art. These same codes would be the ones sent to the Data Bus lines 25-1 to -7, of course, when the output control 158 is activated appropriately by the signal on line 185.

The sequence of events leading to arrival of the signal on line 185 will now be discussed. As can be seen in FIG. 4*a*, Coincidence Circuitry 455 (similar to the structure in copending application I) has a two-input NOR gate 528 with its input lines 530 and 532 tapped, respectively, to lines 431*a* and 431*c* coming from the Q outputs of polarity latches 438A, 438B. Gate 528 is connected via line 534 as one input to a three-input NOR gate 536, the other two inputs of which are linked via lines 538 and 540, respectively, to the output lines 440A and 440B of the channel latches 484A and 484B. The output of NOR gate 536 is a signal termed $\overline{\text{Error}}$ which appears on line 542 connected, as seen in FIG. 4*c*, to the clock input of Output Ready Generator 480, a sampling type latch (FIG. 6*c*) with data input D always high inasmuch as voltage "+v" is applied to it. Accordingly, when a pulse is received on clock input line 542, Latch 480 will be set and the level on its Q output—termed the "Key Ready" signal herein, but also referred to as "Data Good" in the copending applications—will go high, that Q output necessarily being connected to the "Key Ready" line 184, briefly described previously. The Key Ready signal is a concept well known in control circuitry and therefore will not be discussed in detail other than to state that line 184 is scanned periodically by the typewriter control and when the level is found to be high and other activities can be interrupted, the controls will generate the previously-mentioned enabling signal—termed DBE herein—on line 185 to activate Output Control 158, allowing the information on lines 468 to be transferred onto the Data Bus lines 25-1 to 25-7. In terms of the example previously given, the seven lines are then selectively given high signals in accordance with the stated binary equivalent of "62" or "52" depending on whether Shift Key 406 was depressed prior to depressing "Q" Key 526 (FIG. 2).

Clocking of "Output Ready" Latch 480 occurs, of course, only if there is a low level on lines 534, 538 and 540 (all inputs to NOR gate 536). This requires that either or both of the inputs to NOR gate 528 on lines 530 and 532 must be high. Absence of input signals on lines 530 and 532 indicates a negative polarity for both the acoustic waves transduced; an invalid condition as mentioned earlier. Also, the $\overline{\text{Error}}$ signal on line 542 from NOR gate 536 will only be present after pulses have been detected in both Channel A and Channel B. Thus, that signal identifies the end of the Counting Cycle—i.e., Latches 484A and 484B both in the set state.

The output signal from "Output Ready" Latch 480 will remain until that latch is reset. The structure for resetting includes a number of circumstances, as seen in FIGS. 4*a* and 4*c*. There the (inverted) output on line 456-10 (actually the eleventh count since the first count is "0") is connected via a line 548-10 as one input to a NAND gate 550, the other input being a line 452H from the "true" output of Subcounter 448 (inverse of the complementary output on line 523). The output 522 of NAND gate 550, which signifies an invalid output from the furthest tabs of the C type, is connected as one of the two inputs to a NOR gate 556, the other input being a line 554 joined to the output 519 of Inverter 518 tapped to line 432C (designating a type C tab as the one struck). Continuing along, the output of NOR gate 556 on line 558 is seen to be one input to a two-input OR gate 560, the other input 508 of which is tapped to line 459, providing a high level—the "Overflow" signal OVF, as explained earlier—when the integer bits of Counter 447 (output of Counter States 503) have attained a count of eleven, i.e., Counter 447 has overflowed. In turn, the output of OR gate 560 on line 564 is one input to a two-input NOR gate 566, the other input of which is connected to line 185 (the signal DBE). Lastly, the output of NOR gate 566 is one of two inputs to an AND gate 568, the other input of which comes from another NOR gate 570 which has as inputs the "power on" signal PO directly via line 574 or indirectly through a two-input OR gate 602 together with the count of eleven from Time-Out and Reset Generator 436 via line 478.

The output of AND gate 568 appears on a line 572 connected to the inverted reset terminal $\overline{\text{R}}$ of "Output Ready" Latch 480. Thus, if the Data Bus Enable signal (DBE) is present, or if there is a count of eleven at the outputs 452 of Counter Stages 503, or the tab struck was of type C and a signal is present on line 456-10 at the output of Decoding Unit 454 together with presence of a signal in the most significant bit position ($n \leqq 0.5$) of the "Divide-by-24" Subcounter 448 (i.e., the signal on line 452H is high; that on lines 523, 522 low), or the "power on" signal PO is present, or lastly, if there is a count of eleven in the Time-Out and Reset Generator 436, then Latch 480 will be reset by a low input on line 572. In sum, latch 480 is reset: (1.) upon reading out the encoded value to the Utilization Device 151 (normal operation); (2.) upon overflow of Counter 447 (an error condition); (3.) upon detecting a type C tab beyond its furthest location (another error condition); (4.) upon initialization (Power On); or (5.) upon reaching a count of 11 in Time-Out Counter 190 (a catch-all error condition in case none of the foregoing conditions were sensed).

As mentioned previously, variation of the acoustic properties from rod to rod necessitates compensating actions in order to make the counter outputs obtained with such rods compatible with encoding logic designed for "standard" rods. In the embodiments of the present invention, compensation is achieved by blanking out certain pulses as briefly stated earlier in connection with block 460 in FIG. 3.

Figure 4D:
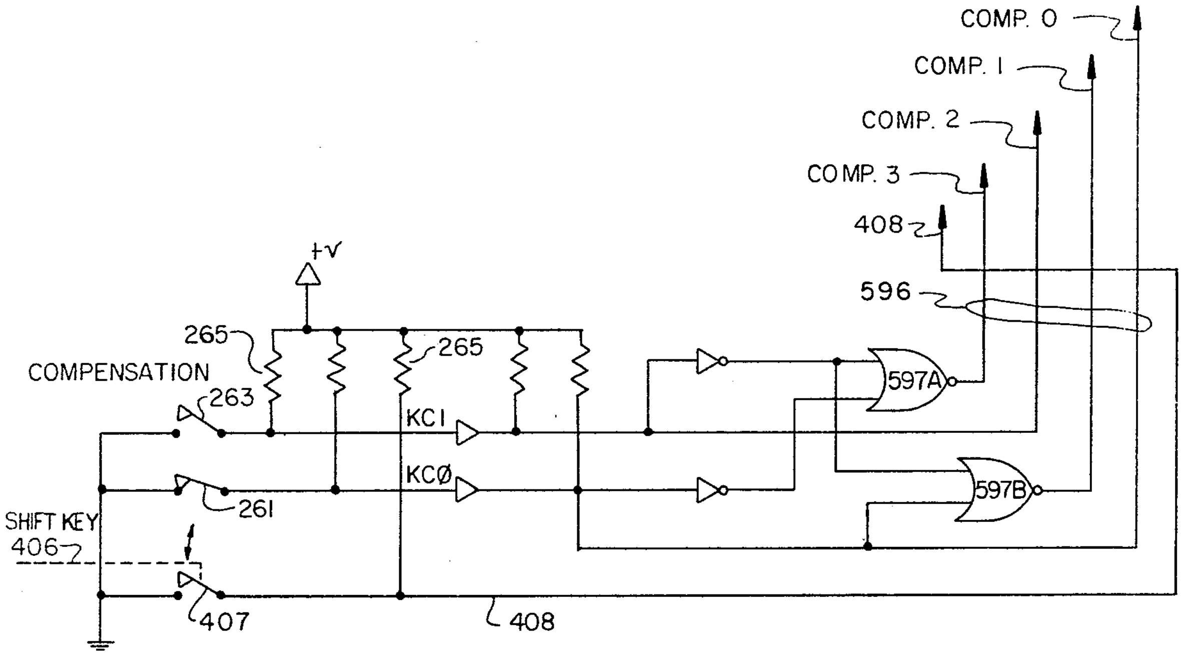

In this first embodiment, FIG. 4c shows that Keyboard Compensation Circuit 462 includes ROM 578 which receives, via tapped lines 457-n, the output from Decoding Unit 454 (lines 456) in conjunction with selection of a particular compensation level determined by the settings of switches 261, 263 shown in FIG. 4d and described in copending application III, these switches (which may alternatively be static devices such as soldered jumpers) being selectively closed or open in any one of four combinations and serving to determine which of the input lines 456 cause signals to appear on the output lines 579 of ROM 578. These last are all joined together as a common input to an Inverter 582, the output of which on line 584 serves as one input to a three-input NOR gate 586 forming part of Blanking Circuit 460. One of the other two inputs to gate 586 is a line 588 from the Q output of a normally reset Sampling Latch 590 used for a purpose to be described shortly and clocked by each pulse on a line 596 tapped to the main clock pulse line 497 previously described. The last input to gate 586 is a line 592 coming from the "Divide by 24" Subcounter 448 (details not shown in FIG. 4a, but discussed more fully in relation to FIG. 5). Line 592 from Subcounter 448 carries a signal indicating whether the subcount is at 24. Normally this signal is high except when the count is 24. On the other hand, line 588 is normally low because of the reset condition of Latch 590. From the foregoing it is clear that there will be a low output from NOR gate 586 (line 594) except when the count in Subcounter 448 is at 24 and, because the count in the integer portion of Counter 447 (Counter Stages 503) has been translated into an output on a particular one of the lines 456-n, Keyboard Compensation ROM 578 emits a high signal on a related one of the output lines 579 which signal is complemented by Inverter 582, thus placing a zero output on line 584. Under these conditions, then, there will be a high output from NOR gate 586 on line 594 linked via tapped line 499 to OR gate 498, previously described as receiving the clock pulses from Oscillator 434 via NOR gate 496 and line 497. In the presence of the high output from line 594, however, the output of OR gate 498 will remain at a high level and thus blank out the next clock pulse (25th pulse) such that it cannot pass along line 461 to clock Subcounter 448.

The duration of blanking is controlled by Latch 590 which has its data input D connected to the above-mentioned line 594. Accordingly, since the clock pulses from source 434 are also supplied to the clock input C of Latch 590 via line 595 tapped to line 497, and the output signal on line 594 from NOR gate 586 is high at the instant described above, Latch 590 will be set by the blanked pulse, bringing the Q output high. Through line 588, this cuts off the output from NOR gate 586, removing the blanking level from line 499 and allowing subsequent pulses to pass through OR gate 498 and to clock Subcounter 448 via line 461 as before. As will be described in greater detail in connection with FIG. 5, a high signal on the fourth Compensation Selection line 596-3, for example, results in a high signal being available on the output line 579 of Keyboard Compensation ROM 578 when the output of Counter Stages 503 is at zero, five and nine, thus blanking one clock pulse at each of those three integral counts. As a matter of fact, a high level on line 596-3 is accompanied by a high level on lines 596-0 and 596-2, because the NOR gating 597a, 597b shown at the bottom FIG. 4d is not mutually exclusive and thus a clock pulse will also be blanked at each of the integral counts: two, four, and seven. Further, though not detailed with respect to FIG. 4c, NOR gate 597b causes ROM 578 to put a high level on line 579 at the integral counts of one, six and eight. From the foregoing, it is evident that selective operation of switches 261, 263 can effect blanking of two or more pulses in a keyboard cycle. It may be noted in passing that there is never any blanking when the integer output of Counter 447 is at the count of three or ten, ouput on line 456-3 or line 456-10, as seen from FIG. 4c, gating ground through devices 581 and 583.

In the embodiments of the present invention, furthermore, actions subsequent to readout of the information in Counter 447 are controlled in slightly different manner. Channel Latch 437 now includes only one output line 470 connected to the reset input of Time-Out and Reset Generator 436, which line 470 is equivalent to the lines 119a, 119b, etc. and OR gate 192 shown in the like-numbered FIGS. 7a, 7b of copending applications I and III, the difference here being that OR gate 192, previously associated with Time-Out Generator 136 of copending application I has been incorporated in the Channel Latch Circuit 437 as the OR gate 469 (described earlier), the end result being the same in both instances—namely, Time-Out Counter 190—a four bit counter forming part of the Time-Out Generator 436—is reset via line 470 each time a pulse appears on any of the lines 118A, B or 218A, B; Counter 190 immediately beginning to count anew at the next clock pulse on line 472. It may be noted at this point, that, for purposes of the invention described herein, the secondary clock pulses appearing on line 472 for clocking Time-Out Counter 190, are derived from the previously-mentioned primary clock source 434, the output of this last on line 474 being passed through a "Divide-by$2^{12}$" (4096 in decimal terms) Counter 476, the resultant pulse train appearing on line 472 at a repetition rate of 1.025 KHz after passage through the normally-enabled Disabling Circuit 477, as will be detailed shortly.

Assuming then that the readout signal DBE has been generated on line 185 and that no further signals are being detected on either of the channels along line 470 at the output of OR gate 469, Time-Out Counter 190 is allowed to proceed. Output signals marking the end of the cycle by resetting the various latches are derived herein from successive counts at the output of Time-Out Counter 190 rather than from the separate latch disclosed in the copending applications. These output signals are obtained at a count of eleven and at an ultimate count of twelve, according to the present embodiments. The signal corresponding to the first of these conditions appears on line 478 to reset "Output Ready" Latch 480, setting of which sent a signal on "Key Ready" line 184 (termed "Data Good" in the copending applications) to Utilization Device 151 for initiating readout of ROM 451 at an appropriate time (much less than that required to reach the count of eleven, which is long enough to assure the absence of "ringing"), as described previously. From FIG. 4b it is seen that the complemented output lines for the one, two and eight bits—binary code for eleven—are supplied either directly or through a two-input OR gate 598 to a respective one of two inputs of a NOR gate 599. The output of this last appears on line 478 connected, along with line 574*a* on which the signal PO appears, to a two-input OR gate 602 (FIG. 4*a* ) having lines 482, 576 (the previously-described reset lines) as its output.

Detection of a count of eleven in Time-Out Counter 190 is used for clearance of the Latches 484A, 484B and, through Inverter 603 (because of complementary reset inputs), for clearance of: Latches 438A, 438B in Channel Latch Circuit 437, and all stages of Counter 447. One secondary clock time later (i.e., 976 microseconds thereafter), the count of twelve in Time-Out Counter 190 gives rise to a further signal on line 479 for blocking clock inputs on line 472 to Time-Out Counter 190, as follows. Line 479 is an input to one of two cross-coupled NOR gates 477*a*, 477*b* forming the Clock Pulse Disable Circuit 477 of FIG. 3. The high signal on line 479 holds the output of gate 477*a* on line 472 at a low level, making it impossible for clock pulses to pass through gate 477*b*. Counter 190 will thus be locked up at the twelve count until the next key input causes appearance of further pulses on lines 118A, B and 218A, B; again giving rise to resetting outputs on line 470 to the Time-Out and Reset Generator 436.

Before discussing the alternate embodiment of FIGS. 5*a*–5*d*, it is desirable to point out commercial components applicable to the structure of FIGS. 4*a*–4*d*. The conditioning Circuits 216A, 216B will not be detailed herein since they have been described in copending applications and the comparators (not shown in FIG. 4*a*) could be implemented by use of the quad high speed comparator package identified by the number LM339 and supplied by National Semiconductor Corporation of Santa Clara, Calif. The cross-coupled NOR gate Latches 484A, 484B and 446 could be realized by using quad NOR gate packages of the 74C02 type while the Sampling Latches 438A, 438b together with the binary stages of the various counters could be implemented by using dual D-type latches of the 74C74 type. Similarly, a demultiplexer of the 74C154 type could be used for Decoding Unit 454 and a ROM of type 2716 (all of these available from the above-mentioned company) could be used for Encoding ROM 451, while multiple transistor units of the C-MOS type supplied under the number 4016 (quad bilateral switches) by the same company could be used for Keyboard Compensation ROM 578 and for Output Control 158 because of the high "off" resistance afforded by switches of this type. The various OR gates, NAND gates, inverters, etc., could be obtained by use of similar multi-unit packages such as the 74C32, 74C08 and 74C04, respectively.

Turn now to FIGS. 5*a*–5*d* which show an embodiment specifically directed to implementation in a single-chip N-MOS configuration and affording significant reduction in area of the chip devoted to encoding logic. The matrix components of ROM 451 in particular being simplified greatly, the area required according to the present invention as compared to that according to copending application III is about 160 square mils less. Most of the logic elements in FIGS. 5*a*–5*d* are identical (at least functionally) to those described in connection with FIGS. 4*a*–4*d*. Accordingly, discussion of these two figures will only be undertaken with respect to items which are generally different, or which were only briefly discussed in FIGS. 4*a*–4*d*.

Figure 5A:
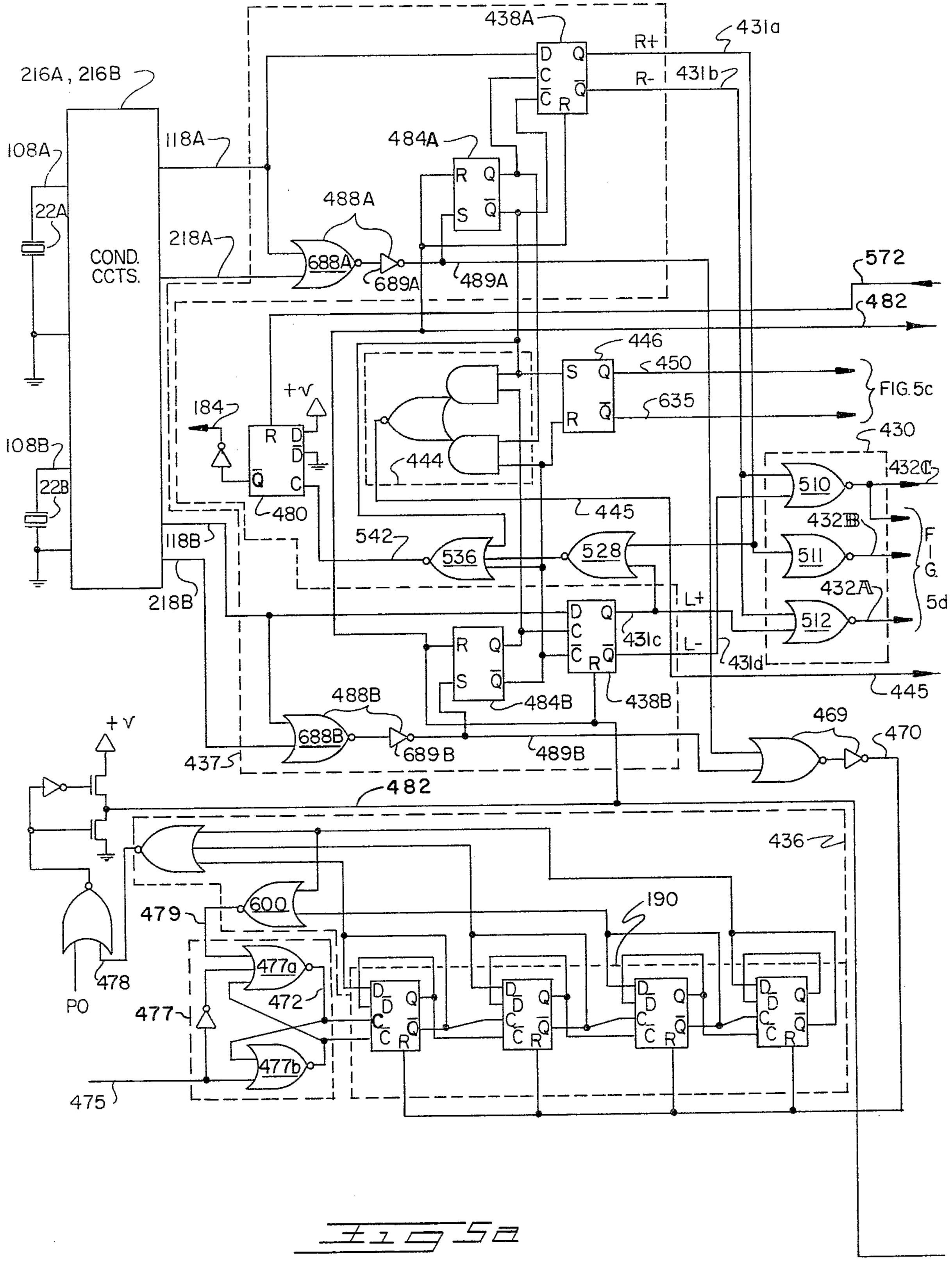

First of all, it will be noted in FIG. 5*a* that the OR gates 488A and 488B are implemented as NOR gates 688A, B connected in series with inverters 689A, B (the same comment applies to OR gate 469 and its output line 470). Similarly, compensation for extra long connecting lines is achieved, in known fashion, by insertion of serial pairs of inverters—e.g., line 456-11, FIG. 5*b*. Since these are obvious logical equivalents, nothing further will be said about them or any other such combinations as they are well-known to those skilled in the art and depend only on the particular layout of the chip (not shown).

As to Counter 447, it consists of the previously described four higher order (integer) Counter Stages 503 and a two part "Divide-by-twenty-four" Subcounter 448, the first part consisting of a two-stage Subcounter 604 defining the least significant bits of Counter 447 and providing four counts in a well-known fashion. The second part of Subcounter 448 is a three-stage Subcounter 606 clocked by the output of the second stage of Subcounter 604 and providing intermediate bits—including as its highest order bit that to the right (assuming left to right presentation for highest bit to lowest bit, which is opposite to the order of the counter stages shown) of the binary point with respect to the integer bits in Counter Stages 503. Subcounter 606 has all three stages clocked simultaneously, the Q or "true" output of each stage being connected to the Data input D of the next higher stage (progressing rightward), with the exception that $\overline{Q}$ (complementary) output of the third stage of Subcounter 606 is connected to the Data input D of its first stage as well as being connected to the clock input of the lowest order of Counter Stages 503. Because of the simultaneous clocking and the mode of interconnection, Subcounter 606 operates in non-sequential fashion—i.e., in decimal notation: one, three, seven, six, four, zero, one, etc., for a total of six different counts. The combination of Subcounters 604 and 606 provides the desired "divide by twenty-four" output, as will be obvious to those skilled in the art from the foregoing description.

Turning next to Decoding Unit 454, in this embodiment adapted to single chip N-MOS implementation of the invention, it is seen to consist of a partially decoded matrix of eight vertical conductors (metal or polysilicon, both types being known lines 452, 452*a*) and twelve horizontal conductors (N-type linear diffusions shown as lines 456-0 to 456-11), the latter terminating in MOSFET "Pull-up Devices" 608 (transistors of the ion-implanted depletion type), the drains 610 of the pull-up devices being connected to their Gates 612 and their Sources 614 being connected to Vdd in known fashion. The eight vertical lines are the inputs to Decoding Unit 454 and correspond to the "true" outputs on lines 452 from the four stages of Counter 503, together with the four related complementary outputs 452*a*. The twelve lines 456-n (horizontal diffusions) are the outputs of Decoding Unit 454, the order of these lines being inverse to that shown in FIG. 4*c*, it will be noted. In the present embodiment, the least significant line (456-0) is at the top and the most significant (456-11) is at the bottom as decoded according to the "Pull-downs" (circles 615) located at four pre-selected intersections of vertical lines 452, 452*a* and each horizontal line 456-n, in accordance with the corresponding binary code.

In fashion known in the art, each horizontal diffusion 456-0 to 456-11 is associated with an adjoining ground or Vss line (not shown but well-known). The Vss lines are N-diffusions serving as a common drain whereas the horizontal lines 456-0 to 456-11 serve as source terminals. The Pull-downs 615 are thin oxide layers between the conductors at their intersections—defining, in essence, the gates of MOSFET devices (of "switches," as they will be termed hereinafter) which conduct only when a high level is present on the gate. Accordingly, the devices operate with inverse logic, the presence of a high signal on the related vertical line 452 or 452*a* grounding the intersected horizontal line 456-n if there is an intervening Pull-down 615. Only when high signals are absent at all four pre-selected Pull-down positions can the level on an output line 456-n go high. Thus, for line 456-0 the pull-downs (circles 615) are located between that line and vertical lines 452-1, -2, -4, and -8 (i.e., binary 15, the complement of which is zero). Similarly, for line 456-3 the Pull-downs 615 are located at lines 452*a*-1, 452-2, 452-4 and 452-8 (the first two being the complementary outputs corresponding to the least significant two bits of Counter Stages 503).

It will be noted further that the 12th horizontal line 456-11, inversely decodes the input according to Pull-downs (circles) 615 located, in this instance, from right to left: 452*a*-1, 452*a*-2, 452-4 and 452*a*-8—i.e., the inverse of an output of eleven from Counter Stages 503. A high level on line 456-11 is the overflow signal OVF previously described in connection with FIG. 3 and FIGS. 4*a*-4*d*, this signal not being supplied to ROM 451, but to NOR gate 496.

Disregarding—for the moment—the tapped lines 457 to Keyboard Compensation ROM 578, the next element encountered at right of Decoding Unit 454 is Add-One Register 464 having ten bit-positions, the individual input lines 456-0 to -9 being normally connected to corresponding output lines 466-0 to -9, but transferable through respective N-MOS pass transistors (termed "switches" or "devices" hereinafter) 616 to the next higher output lines 466-1 to 466-10. The gates 616*g* of switches 616 are all connected in common via line 524 to the output of NOR gate 520. This same line is connected, however, to the gates 618*g* of further pass transistors (switches) 619 through an Inverter 621 and common line 622. In turn, switches 618 are each serially linked with a respective one of the input lines 456-0 through 456-9 at its junction 617 with a corresponding transfer switch 616. Accordingly, when a high output on line 524 is received through NOR gate 520 to indicate that the struck tab is of type C and that the half bit is true (lines 523/522, therefore being at a low level to indicate that the fractional count is ≧0.5), then switches 618 will be open (because of Inverter 621), thus blocking output on the corresponding one of the lines 466-n, while switches 616 will be closed (conducting), allowing that output to appear instead on line 466-(n+1).

As indicated in previous discussion of the block diagram of FIG. 3, output lines 466-0 to 466-10 of Add-One Register 464 become input lines to ROM 451, shown in FIG. 5 as a partially decoded matrix of lines 466-0 to 466-10 intersecting seven-bit sets of vertical lines, there being six of these sets subdivided into two groups (I and II) of three sets each. 626A-C and 627A-C. Similar to the matrix described for Decoding Unit 454, metal or polysilicon conductors form one set of lines here (the horiziontal ones, which implies a conversion from the diffusions of horizontal lines 456 to the metal or polysilicon conductors, with electrical connections established at appropriate points by removal of the intervening oxide layer during fabrication—all of this being known, though not shown), while the vertical lines 626A-C and 627A-C are now the N-type linear diffusions. Just as described earlier, further N-type diffusion lines (again not shown, but known) connected to Vss (ground) are located between the vertical diffusion lines 626, 627. The intersections of the matrix lines are again separated selectively by areas of thin oxide to define the gates of MOSFET "Pull-downs" (circles) 660 which establish the location of each Zero bit in the code output on lines 468 of ROM 451 by connecting the diffusion lines 626, 627 to the Vss lines (ground) wherever the selected horizontal line 466-n passes over a thin oxide layer. The respective vertical lines in each set are interconnected at their upper ends 629 to corresponding lines in the other sets of the same group, such that only one set of seven output lines remains for each group, for reasons becoming evident subsequently. Before proceeding, it should be noted that each vertical (N-type diffusion) line of a set 626A-C or 627A-C is terminated at its other (lower) end by a Pull-up 608 identical to the one described previously in connection with Decoding Unit 454 (FIG. 5*b*).

In addition to the lines 466-0 to 466-10 which enter ROM 451, there are also matching lines 466-a through 466-k interleaved between adjacent pairs of the former. The lines 466-a through 466-k are connected to the lines 466-0 through 466-10 by respective transfer switches 632 having their gates 632*g* connected in common to a line 635 joined to the output of Side Latch 446 and thus having a high signal thereon when that latch is not set—i.e., as explained previously, a condition corresponding only to impacts against tabs on the left side of Bar 420. Also, each line 466-0 through 466-10 has a pass transistor (or switch) 634 respectively inserted in series, in the same fashion as described with respect to the switches 618 of Add-One Register 464. Switches 634 have their gates 634*g* connected in common to line 450, linked to the Q output of Side Latch 446, which latch is set whenever the tab struck is located on the right side of Bar 420. As explained below, actuation of switches 632 and 634 is mutually exclusive so that only one set of input lines to ROM 451 is active at any instant.

Note further that through a tapped line 624, previously-mentioned line 524 is also connected to the gate 625*g* of an MOS transistor (device) 625 having its drain 625*d* grounded and its source 625*s* connected to the drain 618*d*-0 of the lowest order switch 618-0. Therefore, when a high signal is present on gate 625*g*, Device 625 is grounded so as to prevent appearance of a high level on line 466-0 (or alternate line, 466*a*, if there is a high level on line 450 as described above) when line 524 has shifted the output from line 456-0 to line 466-1. Otherwise, conduction of the respective switch 634-0 (or 632*a*) would conflictingly enable encoding through line 466-0 (or 466*a*) in ROM 451.

Of particular interest also are the two extension lines 631, 633 tapped respectively to lines 450 and 635 and each connected in common to the gates of paired sets of devices 628R, 628L inserted in series between ground and a corresponding one of the horizontal matrix lines 466-0 to -10 and 466*a*-*k*, respectively. Accordingly, it follows that the state of Side Latch 446 determines whether the output signal on the selected one of the input lines 466-0 through 466-10 stays on that line or is shunted to the corresponding one of the interleaved horizontal lines 466*a*-*k* and, simultaneously, whether ground is applied to the alternate lines 466*a*-*k* or, conversely, to lines 466-0 to 466-10, respectively. The grounded lines are ineffective in establishing coded output through any of the vertical sets of lines 626A-C and 627A-C.

In summary, if Latch 446 is set (impact on right side), switches 634 and 628L will be closed, while switches 632 and 628R will be open such that the normal horizontal lines 466-0 through -10 alone are effective in determining the output code ultimately emitted on the Data Bus lines 25-1 to 25-7, the interleaved lines 466*a-k* being grounded. Conversely, if Latch 446 is not set (impact on left side), the interleaved (alternate) horizontal lines 466*a-k* will be effective, lines 466-0 through -10 being grounded in that event. Control by the side information has now been made evident.

The next level of control in ROM 451 is that afforded by the tab type information provided on lines 432A,B and C. In FIG. 5*d,* it is seen that this information controls respective sets of switches in each group of three sets (Group I and Group II). Specifically, line 432-A is connected in common to the gates 636*g* (only the first and last of these gates being shown in order to maintain clarity) of a first set of switches 636 each inserted in series in—and thus controlling signal transmission along—a respective line of the leftmost set of seven vertical lines 626A of Group I. Furthermore, line 432 is also joined to all the gates 637*g* of another set of switches 637 inserted in series in the leftmost set of vertical lines 627A of Group II. In similar fashion, line 432 has a connection in common to the gates 638*g,* 639*g* of corresponding sets of Switches 638, 639 inserted in series in the central sets of vertical lines 626B and 627B of Groups I and II, respectively. Lastly, line 432C is joined to all the gates 640*g,* 641*g* of similar sets of Switches 640, 641 inserted in series in the rightmost sets of vertical lines 626C and 627C of Group I and Group II. The respective merged outputs of Group I and Group II appear on corresponding seven-bit sets of vertical lines shown (for illustrative purposes only, the actual layout being a design decision based on many factors not relevant to the invention) as extensions of the sets 626C and 627A. These outputs are subjected, in turn, to a further level of control—namely, the Case Shift input.

As shown in FIGS. 3 and 4*d.* Case Shift Control is in the form of a momentary contact Switch 407 placing a ground on a line 408 when Shift Key 406 is depressed. In the embodiment of FIG. 5*d,* line 408 terminates at the drain 642*d* of an ion-implanted depletion type N-MOS Device 642 connected, in known fashion, through an input protection Resistor 643 to its gate 642*g* which is also joined to an Inverter 644. This last is connected in common to the gates 649*g* of a further set of Switches 649 inserted in series between the vertical lines 626C (i.e., Group I output) and the output lines 468 of ROM 451. The output of Inverter 648 is then led through a further Inverter 650 to the gates 652*g* of yet another set of Switches 652 inserted in series between the set of seven output lines 627A of Group II and corresponding ones of the output lines 468, in common with the gated outputs of Group I on lines 626C.

It is thus clear that when Shift Key 406 is not depressed (lower case), the voltage on drain 642*d* of Device 642 will be high, and through input protection Resistor 643, that same high level will be applied to the series connected Inverters 644, 650; the double inversion causing the high signal to be applied to the gates 652*g* of Switches 652 and, therefore, enabling code determination by Group II according to the state of other control inputs (side, tab type and side information) for selectively activating ROM output lines 468. Conversely, when Shift Key 406 is depressed (upper case), the low (grounded) input to Inverter 644 will become a high at its output and thus close the Switches (Devices) 649, while the second complementation through Inverter 650 will open the Switches 652, thus ensuring that only a code selected from Group I can be placed upon ROM output lines 468.

For readier understanding, consider next a few examples taken from Table I. First of all, assume that the letter "h" (key 525) has been struck and that there was not a preceding depression of Shift Key 406. From Table I, it is seen that depression of the h key results in an impact against the type C tab 421 at the center of Bar 420. Accordingly, from one to eleven pulses (according to the particular bar. temperature, etc) are applied to Counter 447 with the result that Latches 484A and 484B will be set as well as both Latches 438A and B. Side Latch 446 may or may not be set, depending upon whether Transducer 22A happens to be significantly closer to the midpoint of the particular bar as compared with Transducer 22B, although this is not necessarily visible or even measurable with ordinary instruments since the elapsed times of concern are of the order of microseconds. In any event, it is clear that since Shift Key 406 was not depressed, the Shift signal to the Drain 642*d* of Device 642 is high. Thus via Inverters 644 and 650, that high signal will close Switches 652 to render effective the Group II vertical matrix lines 627A–627C, of which the last will be selected for output since impact on Tab 421 will have given rise to a high signal on line 432C. That signal will close switches 641 related to vertical lines of 627C (the switches 640 will also be closed, but to no avail since switches 649 will remain open in view of the high signal at the input of Inverter 644). Because of the number of clock pulses supplied to the counter ranges between one and eleven (fractional count <0.5 in Counter 447) when the "h" key is depressed, there will be a high input on line 522 to NOR gate 520 with the result that the level on line 524 will be low such that switches 616 will not be closed, thus blocking any transfer by Add-One Register 464. Through Inverter 620 connected to line 524, however, there will be a high output on line 622, closing switches 618 for normal connection to lines 466-0 to 466-10 at the output of Add-One Register 464.

As will be recalled, at the entrance to ROM 451 the output of Add-One Register 464 is applied either to an extension of the lines 466-0 to -10 or transferred to the interleaved set of parallel horizontal matrix lines 577*a–k.* Selection between these sets is determined according to signals applied to the gate 634*g* of Devices 632, 634, controlled by the output of Side Latch 446 on lines 450 and 635, it will also be remembered.

In the particular case of Tab 421, as shown in Table I, it does not matter which of the above lines is active because the same code output is obtained for both—namely, the binary code equivalent to seventy. In the seven bit notation corresponding to the vertical lines 627C, this would be binary code 1000110. The "Pull-downs"—circles 660—show the necessary interconnections (upper right corner of matrix in FIG. 5*d*) between horizontal matrix line 466-0, 466*a* and vertical matrix lines 627C (a circle 660 being located at each position corresponding to logical ZERO, because of the inverse logic characteristics of chips of the N-MOS type).

On the other hand, if depression of the "h" key was preceeding by depression of Shift Key 406, then the low level at Drain 642*d* of Device 642 through Resistor 643 will cause the output of Inverter 644 to go high, closing switches 649 to enable output by one of the three sets 626A–626C of Group I lines. Again, the last-named set will be the one selected via the high signal on line 432C which closes switches 640. From Table I, eighth column, it is clear that the code for upper case "H" is forty-nine or, in binary notation corresponding to the seven vertical lines 626C: 0110001. As before, Pull-downs 660 are located at the logical ZERO positions (see circles to left of ref. numeral "466*a*").

Consider another example: depression of the "1" key (lower case) which strikes a type A tab on the left side of Bar 420. In this instance, line 625 is at a high level and line 450 is low, thus causing switches 632 to be closed and switches 634 to be open, such that the interleaved horizontal matrix lines 466*a–k* are effective. The "1" key corresponds (see Table I) to an integral count output of 7 from Counter 447, hence the high signal from Decoding Unit 454 is on the interleaved line 466*h*, instead of line 466-7, the binary code to be generated via Group II lines 627A being 1001111 (seventy-nine). In the same fashion, the exclamation point (upper case at that location) generates the binary code 1010011 (eighty-three), as can be seen from the location (inverse) of "Pull-down" (circles) 660 at the intersections of line 466*h* with lines 626A.

Though remaining points given in Table I are not explained in detail, ROM 451 of FIG. 5*d* includes designation of the pull-down locations for their corresponding codes.

With respect to output of the codes to Utilization Device 151 via Bus lines 25-1 to -7, it is evident from FIG. 5*d* that Output Control 158 consists of a set of seven non-Inverting Buffer Switches 654, these being tristate devices with a high "off" resistance (similar to the type 4016 of the first embodiment) the gates 654*g* being connected in common to a line 656 joined to the keyboard Data Bus Enable Line 185 (DBE) via an Inverter 658. This last is needed because the gate controls for Switches 654 are such that a high signal "disables" or prevents output—i.e., a low level is needed on the gates 654*g* to achieve output on the respective Data Bus Lines 25-1 to 25-7. Inverter 658 may be dispensed with, of course, if the signal on line 185 is already complemented.

Figure 5B:
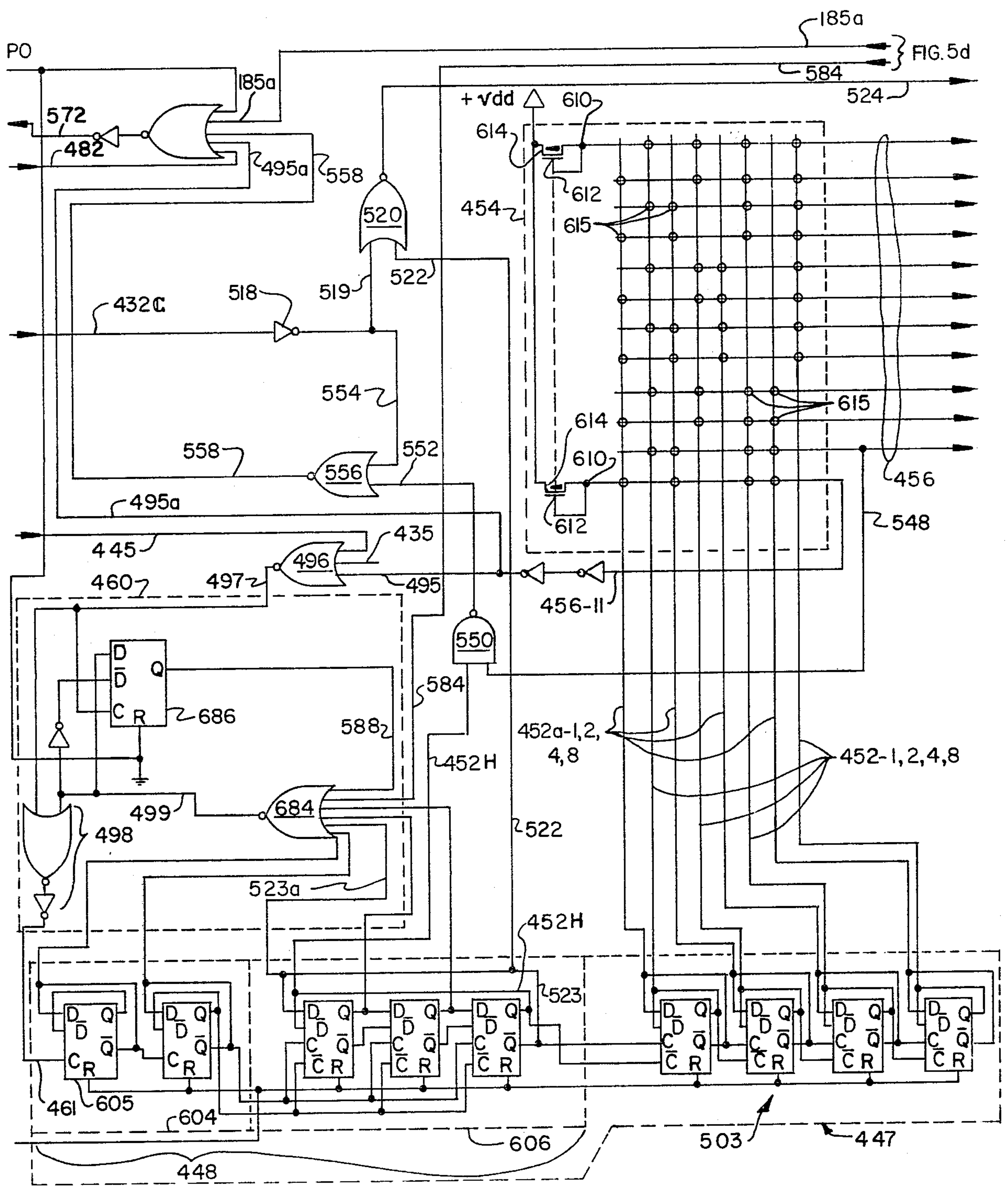

Turning now to Blanking Circuit 460 and its interrelation with Keyboard Compensation Circuit 462, in FIG. 5*b* the configuration of Decoding Unit 454 differs from that in the previous embodiment mainly because the Inverters 514 are not needed here, the outputs on lines 456-0 to 456-11 being "true" because the Pull-downs 615 are located at the complementary junctions of the input matrix. From FIG. 5*b* it is seen moreover, that the switches 261 and 263 again control selection of particular counter outputs at which to blank out a clock pulse to the counter, in the manner described in connection with FIGS. 4*a*–4*d*. Switch 261 is shown closed and switch 263 is shown open as is appropriate for a "standard" bar 420, according to copending application III. Closure of switch 261 applies ground to the junction 645 between an input protection resistor 647 and the drain terminal 646*d* of a device 646 similar to device 642 and resistor 643, previously described in connection with sensing depressing of Shift Key 405. As before, the other end of resistor 647 is connected both to the gate 646*g* of device 646 and to an inverter 648.

Circuit 462 will now be described in greater detail with respect to FIGS. 5*b*, 5*c*. First of all, Compensation ROM 578 consists of nine transfer devices (gates) 662 with their drains 662*d* connected in common to line 579. Each device 662 has its gate 662*g* connected to a respective one of the output lines 456-n of Decoding Unit 454 by means of a tapped line 457-0 to 457-9, except that lines 457-3 and 457-10 are joined to the gates of devices 581 and 583 having their drains connected to ground, just as in FIG. 4*c*. Common line 579 is again connected to inverter 582, with the output on line 584 linked to Blanking Circuit 460, as previously described in regard to FIGS. 4*a*–4*b*.

The sources 662*s* of the transfer devices 662 respectively activated by signals on lines 457-0, -5 and -9 (tapped to the correspondingly numbered output lines 456 of Decoding Unit 454) are connected in parallel to a line 666. Similarly, the source of the particular device 662 activated by output on line 457-4 is connected to a line 667, while the sources of the devices 662 activated by signals on tapped output lines 457-1, -6, and -8 are connected in common to a line 668. Lastly, the sources 662*s* of the particular devices 662 controlled by signals which appear on the tapped output lines 457-2 and -6, are connected in common to a line 669.

Figure 5C:
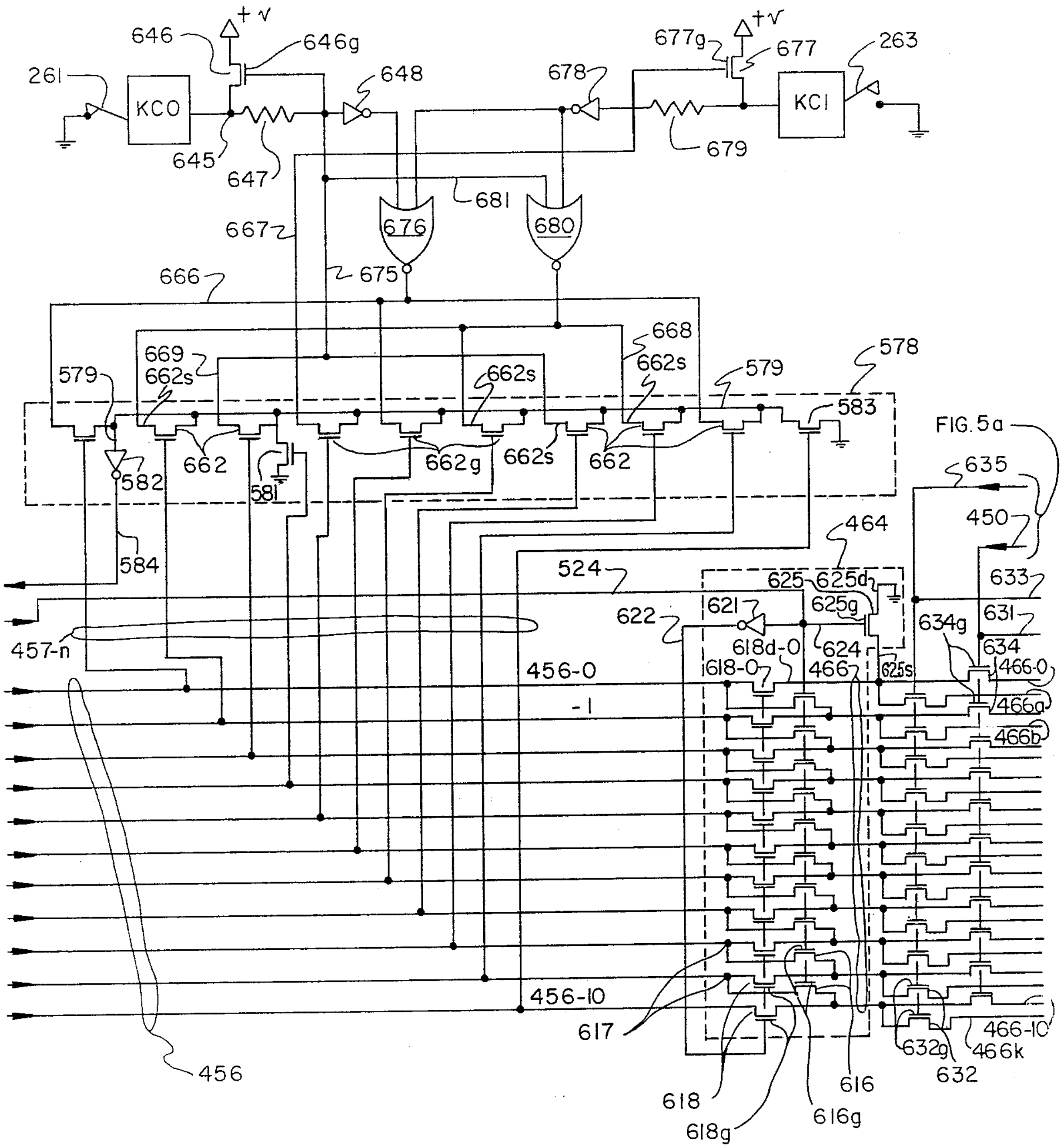
Figures 5A, 5B:
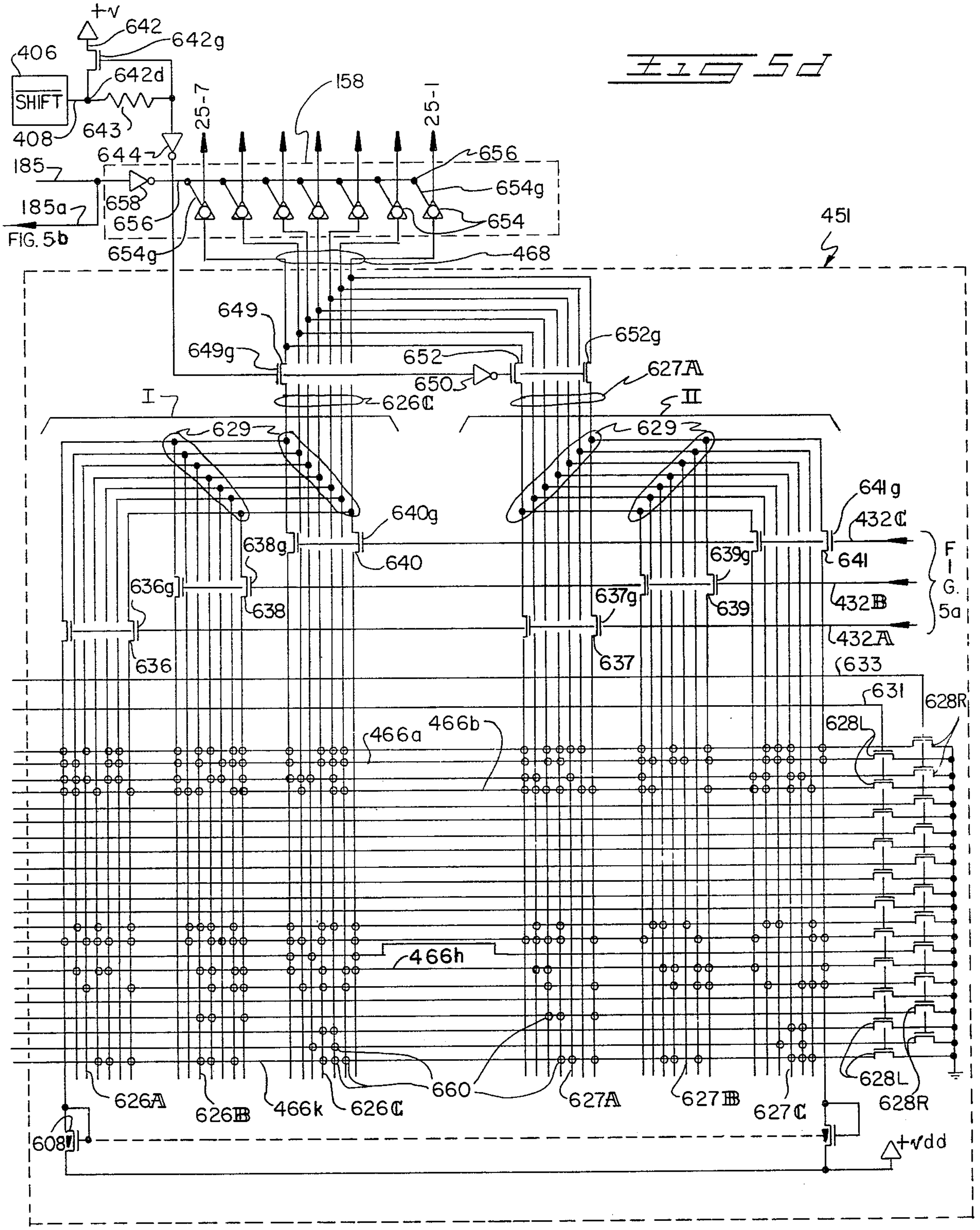

From FIG. 5*c*, it is seen that because of the closed condition of switch 261 (usual case), ground is applied through resistor 647 to the input of inverter 648 and also to line 669 via a tapped line 675. Thus, line 669 would be at ground under the circumstances and accordingly ineffective in terms of operation of Blanking Circuit 460 because conduction of either of the related devices 662 would ground line 579, inverter 582 then putting a high level on output line 584. On the other hand, the output of inverter 648 comprises one input to a two-input NOR gate 676, the second input of which comes from an Inverter 678 connected through an input protection resistor 679 jointly to switch 263 (open, as shown in FIG. 5*c*) and to the drain of a device 677 which has its gate 677*g* connected to the input of inverter 678. Under these conditions, the level at the input of inverter 678 will be high and its output to NOR gate 676 will be low. Because the ground on inverter 648 put a high level at the other input to NOR gate 676, the output of this last will, however, be low and thus line 666 will also be ineffective, for the reason given previously with respect to line 669.

A further two-input NOR gate 680 has one input from line 675 via another tapped line 681, its second input being connected to the output of inverter 678. Resistor 647 being grounded via switch 261 under the stated circumstances, the level on lines 675, 681 will be low. Similarly, switch 263 being open, the level at the input of inverter 678 will be high and its output connected to NOR gate 680 will likewise be low. Accordingly, both inputs being low, the level on output line 668 of NOR gate 680 will be high, putting a high level on the sources 662*s* of related transfer gates 662-1, -6 and -8 and, therefore, on line 579 when these gates 662 are activated by the signals appearing on lines 457-1, -6, and -8 tapped to the corresponding output lines 456 of Decoding Unit 454—i.e., a high level appearing on the respective lines at the counts of one, six and eight in Counter Stages 503, for example.

The high level of inverter 582 through lines 579 at the foregoing integer counts would accordingly result in a low level on line 584 to one of seven inputs in a large NOR gate 684 (FIG. 5*b*) forming part of Blanking Circuit 460 in this embodiment. NOR gate 684 operates in conjunction with a Latch 686 equivalent to Latch 590 of FIG. 4*b*, but—for reasons of avoiding race conditions, occasionally encountered with N-MOS circuit realizations—in this single chip embodiment, Latch 686 has been changed to the single clock, multiple input (true and complemented) variety identical to the latches 605 used as stages of subcounter 448 (see FIG. *6c*) because that structure is less susceptible to such problems.

As with latch 590 in FIG. *4b*, the main clock input (435) through NOR gate 496 (see FIG. *5b*) clocks Latch 686, setting it if there is a high level on the output line 499 from large NOR gate 684. Note that one input to NOR gate 684 is a feedback input on line 588 from the Q output of Latch 868 for a reason seen later. The other five inputs to NOR gate 684 are the complementary (Q) inputs from the least significant Stages 604 of Subcounter 448, together with the Q outputs of the first two stages and the $\overline{Q}$ output of the third stage of most significant Stages 606 of that same subcounter. Because of the non-sequential operation of Counter Stages 606, there will be zero inputs on each of these lines only after 24 clock pulses have been counted. The fractional count of 24 thus puts low signals to NOR gate 684 in conjunction with the low signals on line 588 from latch 686 and on line 584 at the above-mentioned integer counts (1, 6 and 8) of Counter Stages 503, the resultant high output from NOR gate 684 blanking the next pulse (25th) issuing from gate 496, though that pulse will still clock Latch 686 and set it because of the high value at its D input. The above-mentioned feedback via line 588 will then lower the output of NOR gate 684 once again, such that duration of blanking is therefore just one pulse interval.

Devices 581, 583 with their gates **581*g* and 583*g* terminating the tap lines 457-3 and 457-10, are connected between common line 579 and ground. Accordingly, whenever these integer counts appear, devices 581, 583 conduct and thus ground the input to inverter 582, the high output of which disables the large NOR gate 684. Accordingly, it is obvious that no blanking occurs at the counts of three and ten from the output of Counter Stages 503 (integer outputs of Counter 447**).

From the above, it will now be clear that by selective use of the Keyboard Compensation controls (switches 261, 263 or equivalent), one can adjust for bars 420 made of stock having a sonic velocity which falls outside the normal tolerance, and thus extend the range of utility of the invention. In particular, the arrangement detailed in FIGS. *5a–5c* provides for selectively blanking pulses at various counts according to the scheme: 24x+25—e.g., 25, 49, .. 241—where x is any digit from 0 to 9 except 3; selection being achieved by appropriate closures of either, both or neither of the switches 261, 263.

In addition to the foregoing detailed remarks a few items of general information regarding the figures should be mentioned. First, note that it is desirable to match the capacitance of lines 489A, 489B in FIG. *5a* to insure that the propation delays are the same in both channel A and channel B, thus minimizing the time measurement error. Second, it may be mentioned that the location of the devices 628R, 628L on the right side of ROM 451 in FIG. *5d* is not critical and that they could just as well be located on the left side of the matrix, if desired. Third, the latch elements shown in FIGS. *6a–6c* should be discussed slightly even though familiar to those skilled in the art. To begin with, the latch circuit of FIG. *6a* chosen for the "positive wave front" latches 438A, 438B of the second embodiment is a simple, compact structure suitable for the latches used in tab type determination, needed only after an output from Coincidence Circuitry 455 (FIG. 3) indicates that the counter cycle is ended and that Utilization Device 151 is to be alerted as to the availability of a key code.

On the other hand, the latches of the types shown in FIGS. *6b*, *6c* can be utilized mainly in Counters 190 and 447 of FIGS. *5a–5d* which derive their inputs directly or indirectly from clock generator 434 (4.28 megaherz). The main differences in these circuits stem from the fact that non-overlapping complementary clock signals are necessary in N-MOS circuitry, as mentioned earlier, for avoiding race conditions conductive to spurious outputs. The cross-coupled OR/NAND and AND/NOR structures 692, 694 of the latch of FIG. *6c* develop—in known fashion—output signals on the Q and $\overline{Q}$ terminals exhibiting the desired non-overlap relationship despite the fact that only the basic clock pulse from clock generator 434 is available in the particular chip layout. These output signals are thus suitable as the complementary clock signals for input to the remaining latches in stages 503 and 606 of Counter 447, which latches can all be of the type shown in FIG. *6b*.

As to this last figure, the device 696 shown therein with source and drain terminals both connected to ground is a known arrangement present for purposes of charge storage. The stored charge, if any, is then available for appropriate control of the latch when the non-overlapping clock pulses C appears. It may be noted that Reset of the latches of FIGS. *6a–6c* can be achieved by direct grounding of the Q output of a latch—as is known in connection with N-MOS chip design, though not possible with transistor logic (TTL). As seen in FIGS. *6b–6c*, direct grounding can be applied not only at the Q output (as above) but also at an intermediate point (as shown), or at both these locations simultaneously and may even be applied in conjunction with a clock pulse, if desired.

Lastly, though not described in connection with FIG. *5a*, the comparators of Conditioning Circuits 216A, 216B can be implemented in the N-MOS chip comprising the circuits of FIGS. *5a–5d* by incorporating structure similar to the differential amplifiers invented by Stephen K. Mihalich and disclosed in U.S. Pat. No. 4,240,039 issued Dec. 16, 1980, and assigned to the previously mentioned National Semiconductor Corp.

To summarize, the foregoing specification discloses acoustic encoding apparatus 10, where mechanisms 14 operated by keys 26 cause strikers 18 to impact an acoustic member 420, giving rise to divergent waves of the same or opposite polarity selectively according to whether the impact occurs against one tab or another of a set comprising a non-polarizing tab 21 and a raked polarizing tab **221*a* or 221*b*, which tab set is at a predetermined distance in a given direction from the midpoint of member 420. According to the invention, member 420 has an identical tab set in mirror-image arrangement at the same distance in the opposite direction from the midpoint of member 420. By use of a pair of transducer 22A, 22B at opposing positions on the member, the divergent waves are transduced into electrical signals with a time lapse between them. Electronic logic 216A, 216B, 437, 444 and 447 converts the elapsed time and polarity information into a binary representation of an integer indicative of the ordinal location of the tab set relative to the midpoint, the side on which the tab is located, and the type of tab. From these pieces of information together with the upper/lower case information, the code appropriate to depression of a particular key is generated through use of a ROM 451**.

While specific embodiments of the invention have been disclosed, those skilled in the art will readily envision further modification and improvement based on this description. In particular, the paired tab sets need not occur in the sequence shown for Bar 420—i.e., the merged pair of tabs A/B could be at or closest to the midpoint and precede a type C tab in each direction, although the particular embodiment having such a tab at the mid-point in a mirror-image configuration would be limited to decoding one less key (64 keys instead of the 65 disclosed in the present embodiment). While this modification is not preferred herein, under some circumstances it might be desirable and is therefore to be considered to come within the scope of the claims. Furthermore, while the foregoing description discloses structure for adding one to the integer portion of the count under certain conditions, it will be clear that equivalent structure could provide, conversely, for subtracting one from the larger integer under inverse conditions and achieve the desired result: a single, unique number identifying a set of three tabs at a particular distance from the center of Bar 420 as being the source of the impact and—together with the side, tab type and case information—facilitating generation of a code indicative of the key 26 actually depressed. Such structure is contemplated as being an obvious extension of the invention. Accordingly, the invention is not to be limited to the description, but is to be defined solely by the claims and any improvements and modifications falling within the scope of the claims are intended to be included within the invention.

We claim:

1. In an encoding apparatus of the acoustic type comprising an acoustic member of the kind having diverging wave fronts traveling within the member upon selective activation of any one of a plurality of tabs on the member, the wave fronts being of the same or different polarity; transducers operatively connected to the member for sensing the diverging wave fronts and producing signals with an elapsed time therebetween, the improvement wherein said plurality of tabs are arranged in sets comprising a non-polarizing tab producing wave fronts of the same polarity and at least one polarizing tab producing wave fronts of different polarity, said sets of tabs being disposed along the member in mirror-image pairs with respect to the midpoint of the member; time-responsive units connected to the transducers for generating from the elapsed time a discrete output signal for each said mirror-image pair of tab sets, together with first means connected to the transducers and responsive to the polarity of each wave front for providing a first signal on sensing wave fronts indicative of an impact against said non-polarizing tab of a set and a second signal on sensing wave fronts indicative of an impact against said polarizing tab of the set; means connected to the transducers and responsive to the relative sequence of said sensed wave fronts for producing a third signal indicating the side of said member on which a wave front is first sensed, and code-generating means producing a unique code identifying the particular tab inducing said acoustic energy, said code-generating means being responsive to said discrete output signal and one of said first and second signals in conjunction with said third signal.

2. An encoding apparatus according to claim 1 wherein a non-polarizing tab is located at the mid-point of the member, said non-polarizing tab being shared by the polarizing tabs to the immediate right and left thereof in defining each set of the first pair.

3. An encoding apparatus as defined in claim 2, wherein each set has two polarizing tabs: a first tab emitting waves having a wave front of given polarity upon activation thereof, and a second tab emitting waves having a wave front of opposite polarity upon activation thereof.

4. An encoding apparatus as defined in claim 3 wherein said time responsive units include a counter providing discrete counts comprising an integer as said output signal and said two polarizing tabs have their bases merged such that when either is activated, the counter provides the same integer.

5. An encoding apparatus as defined in claim 4 wherein activation of said non-polarizing tab of a given set produces an elapsed time within a range including counts having an integer portion differing by unity from said integer produced by said polarizing tabs and further including means responsive at least to said first signal and operable to change said integer portion by unity and thereby provide said integer as said output signal upon activation of any tab of said given set.

6. An encoding apparatus as defined in claim 5, wherein activation of said non-polarizing tab causes said counter to provide first counts having a fractional portion greater than or equal to a median value, and, alternatively, second counts having a fractional portion less than said median value, and said means changing said integer portion by unity are responsive jointly to said first signal and the fractional portion of said first counts.

7. An encoding apparatus as defined in claim 1 wherein said time-responsive units include a counter, said counter being operated by a source of clock pulses and each tab of a set, when activated, causing said counter to output a range of pulse counts as a function of temperature and other factors, together with means reducing said range of pulse counts to a single integral count related to the progressive distance of each set from the mid-point of said acoustic bar.

8. An encoding apparatus as defined in claim 7, wherein said non-polarizing tab produces a range of pulse counts with an average value less than the integral count established for the polarizing tab of the same set, said counter including a sub-portion thereof generating a fractional count output, said pulse count range reducing means being responsive to a particular fractional count from said sub-portion of the counter and said first signal upon activation of the non-polarizing tab of said set to raise thereby the integral count obtained from said counter by unity.

9. An encoding apparatus as defined in claim 8, wherein said particular fractional count is greater than or equal to one half.

10. An encoding apparatus as defined in claim 8, wherein said unique code is an m-bit code and the output of said counter is in binary form, further including an encoding matrix terminating in a group of m lines, together with decoding means converting said binary output to a signal on an nth one of N output lines, said encoding matrix providing said unique code on said m lines in response to said signal on the nth line and a particular one of said first and second signals in conjunction with said third signal.

11. An encoding apparatus as defined in claim 10, wherein there are two polarizing tabs in each set, comprising a first polarizing tab having a wave front of a given polarity for producing said second signal, together with a second polarizing tab having a wave front of polarity opposite to said given polarity and producing a fourth signal indicative of an impact against said second polarizing tab, said code generating means producing said unique code in response to a single integral count and one of said first, second and fourth signals in conjunction with said third signal.

12. An encoding apparatus as defined in claim 11, wherein said two polarizing tabs have their bases merged. each thereby providing the same integral count in the counter when activated.

13. An encoding apparatus as defined in claim 7, wherein said tab sets are uniformly spaced along said bar, said range of counts has a maximum value k substantially constant for all tabs, and said range reducing means comprises a divide-by-(k+1) portion of said counter.

14. An encoding apparatus as defined by claim 13, wherein one of said tabs is located at the midpoint of said bar, is a shared member of sets to either side of the midpoint, and the range of counts for said tab located at said midpoint has a maximum value substantially equal to k/2.

15. An encoding apparatus as defined in claim 14, wherein said tab at the midpoint of said bar is a non-polarizing tab.

16. An encoding apparatus as defined in claim 7, wherein activation of said non-polarizing tab of a given set produces an integral count differing by unity from the integral count produced by said polarizing tabs and further including means responsive at least to said first signal and operable to change said integral count by unity and thereby provide said single integral count as said output signal upon activation of any tab of said given set.

17. An encoding apparatus as defined in claim 16, wherein activation of said non-polarizing tab causes said counter to provide first outputs having a fractional portion greater than or equal to a median value and, alternative outputs having a fractional portion less than said median value, and said means changing said integral count by unity are responsive jointly to said first signal and said first outputs.

18. An encoding apparatus as defined in claim 1, wherein activation of a particular one of said non-polarizing and polarizing tabs of a given set produces an elapsed time within a range including counts comprised of a particular integer portion and activation of another of said tabs of the given set produces an elapsed time within a range of counts comprised of an integer portion differing by unity from said particular integer portion, and further including arithmetic means responsive at least to a preselected one of said first and said second signals and operable to equalize said integer portions, thereby providing the same integer as said output signal upon activation of any tab of said given set.

19. An encoding apparatus as defined in claim 18, wherein said arithmetic means equalizes said integer portions by addition of unity of the lesser of said integer portions.

* * * * *